(12) United States Patent
Albertson

(10) Patent No.: US 8,564,927 B2
(45) Date of Patent: Oct. 22, 2013

(54) POWER CONDITIONING AND SAVING DEVICE

(71) Applicant: PowerMag, LLC, Chicago, IL (US)

(72) Inventor: Robert V. Albertson, Alma, WI (US)

(73) Assignee: PowerMag, LLC, Chicago, IL (US)

( * ) Notice: Subject to any disclaimer, the term of this patent is extended or adjusted under 35 U.S.C. 154(b) by 0 days.

(21) Appl. No.: 13/664,737

(22) Filed: Oct. 31, 2012

(65) Prior Publication Data

US 2013/0119949 A1    May 16, 2013

Related U.S. Application Data

(60) Provisional application No. 61/553,431, filed on Oct. 31, 2011.

(51) Int. Cl.
  *H01G 5/00*    (2006.01)
(52) U.S. Cl.
  USPC ............................................. 361/272; 361/289
(58) Field of Classification Search
  USPC ............... 363/16, 17, 271–330, 519, 535;
      429/122, 199, 164, 180, 181, 231.3,
      429/211, 217; 307/104, 109; 361/272, 273,
        361/278, 279, 289, 290, 293, 296
  See application file for complete search history.

(56) References Cited

U.S. PATENT DOCUMENTS

| | | | |
|---|---|---|---|
| 2,641,647 A | | 6/1953 | Wallin |
| 2,806,509 A | | 9/1957 | Bozzacco et al. |
| 2,965,836 A | | 12/1960 | Robinson |
| 3,450,962 A | * | 6/1969 | Doran et al. ............... 257/727 |
| 3,631,532 A | * | 12/1971 | Hedberg et al. ........... 361/248 |
| 3,710,050 A | * | 1/1973 | Richards ................ 200/61.43 |
| 4,035,697 A | * | 7/1977 | Arnold, Jr. ................. 361/289 |
| 4,415,949 A | * | 11/1983 | Blickstein ................. 361/296 |
| 5,420,799 A | | 5/1995 | Peterson et al. |
| 6,473,289 B1 | | 10/2002 | Weisse et al. |
| 6,587,328 B2 | * | 7/2003 | Bigler et al. .............. 361/326 |
| 6,813,135 B2 | * | 11/2004 | Nakamura et al. ........ 361/277 |
| 7,061,745 B2 | * | 6/2006 | Funk et al. ................ 361/272 |
| 7,688,036 B2 | * | 3/2010 | Yarger et al. .............. 320/137 |
| 7,872,453 B2 | | 1/2011 | Su |
| 2010/0187914 A1 | | 7/2010 | Rada et al. |
| 2010/0259230 A1 | | 10/2010 | Boothroyd |

OTHER PUBLICATIONS

Hai et al., Electromotive force and huge magnetoresistance in magnetic tunnel junctions, Nature, 2009, pp. 489-492, vol. 458.
Kopp et al., A Possible Magnetite/Maghemite Electrochemical Battery in the Magnetotactic Bacteria, American Geophysical Union, Fall Meeting 2004, abstract #GP34A-06, 2004, 2 pages.
Multifaceted Magnetite Promising for Batteries, ChemViews, Chemistry, a European Journal, 2011, 1 page.
Westenhaus, The Birth of the Magnetic Battery, New Energy and Fuel, 2009, 3 pages.
International Search Report and Written Opinion dated Apr. 5, 2013 in corresponding International Application No. PCT/US12/62665 filed Oct. 31, 2012, 14 pages.

* cited by examiner

*Primary Examiner* — Rajnikant Patel
(74) *Attorney, Agent, or Firm* — Eric L. Sophir; Dentons US LLP

(57) ABSTRACT

Systems and methods are disclosed herein to a power factor adjustor comprising: a power factor measurement unit configured to measure the power factor on an input line to a load and generate a power factor correction signal based on the measured power factor; and a power factor adjustment unit connected to the power factor measurement unit comprising: a fixed capacitor connected in series to a first switching device; and an adjustable element having a variable capacitance connected in parallel to the fixed capacitor and in series to a second switching device, wherein the overall capacitance of the power factor adjustment unit is adjusted by adjusting the capacitance of the adjustable element or by toggling the first and second switching devices in response to the power factor correction signal.

29 Claims, 21 Drawing Sheets

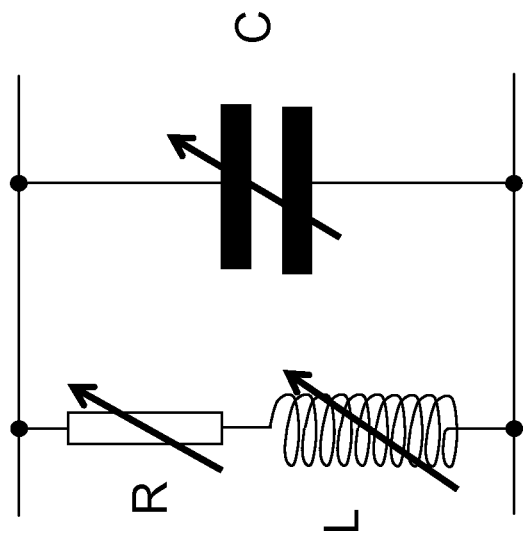
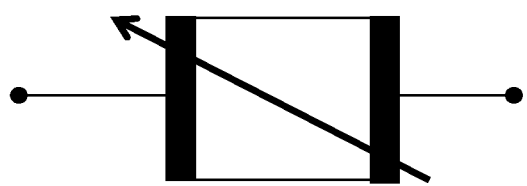
Fig. 13

POWER CONDITIONING AND SAVING DEVICE

CROSS REFERENCE TO RELATED APPLICATIONS

This non-provisional patent application claims priority under 35 U.S.C. §119 to U.S. Provisional Patent Application No. 61/553,431, entitled "Power Conditioning and Saving Device," filed on Oct. 31, 2011, which is hereby incorporated by reference in its entirety.

TECHNICAL FIELD

The invention relates generally to the supply of electrical power. More particularly, the invention relates to reducing power expenditure in an electrical power delivery system.

BACKGROUND

Electrical power companies and the customers of power companies have a mutual interest in reducing the amount of power wasted in a power delivery system. Power companies engineer transmission lines, transformers, and generators to provide the power that all of their customers will draw. Even though some of the power drawn by the customers is not used by the customers, the power companies still have to engineer transmission lines, transformers, and generators to provide this additional wasted power. Further, some power transmitted to customers is not used by the customers or wasted, but is "reflected" back to a power generator. Thus, the transmission lines have to carry both the transmitted power and the reflected power. Not only does this mean that the transmission lines must be engineered to carry both the transmitted and reflected power, but it also means that losses in the transmission lines, transformers, and loads are increased because there are losses both in the transmitted power and the reflected power traveling through the power system.

The power factor is the ratio of the real power supplied to a customer compared to the sum of the power supplied to the customer and the power reflected back to the power company is known as the power factor. A power factor of 1 is considered ideal. Power companies typically charge residential customers only for real power. Industrial customers, however, may be charged for real power with an additional charge for power factor. Usually, a power company may not apply an additional charge for power factors above a threshold, but industrial customers may be charged in proportion to the power factor below that threshold. The threshold varies for each power company, but is generally between 0.85 and 0.95. Thus, if the power company sets the threshold at 0.95, and the customer's power factor is 0.85, then the power company may charge a fixed tariff on all of the real power used. Typical tariffs for poor power factor can be about 10%.

Correcting power factor has benefits other than the cost of the power. The internal electrical capacity of the customer system increases because lower currents are required to deliver the same power. As a result, additional equipment can be powered without providing increased capacity wiring, switch boxes, and transformers. Voltage drops at the point of use may be reduced, and under-voltage reduces the load that motors can carry without overheating or stalling.

Reduced power factor can be caused by several mechanisms. A first mechanism is reactive loads caused by capacitors, inductors, or some combination of capacitors and inductors. These loads shift the phase of the current supplied to the customer relative to the voltage. The phase shift means that during some parts of the alternating current (AC) cycle, excess power is delivered to the customer in addition to real power consumed, and at other parts of the AC cycle, the excess power is returned to the power company. The power factor reduction by this mechanism can be corrected by adding a suitable cancelling inductor or capacitor to the customers power circuit. One issue with adding the cancelling inductor or capacitor is that the required inductor or capacitor may vary depending on how the equipment of the customer is used. Some systems adapt to changing use by switching in or out additional capacitors or inductors.

Nikola Tesla introduced induction motors. Induction motors present a lagging power factor to the power line dependent on the load. A large loaded induction motor can have a power factor as high as 0.90. The power factor for a small low speed motor can be as low as 0.5. An induction motor during a startup can have a power factor in the range of 0.10 to 0.25, rising as the rotor spins faster.

As a second reduced power factor mechanism, a customer could not take as much power from all parts of the AC cycle. Switch mode power supplies, for example, take most power at the peak of the voltage cycle. This tends to "flatten" the shape of the sine wave of the power signal, causing harmonics. The harmonics generate unwanted signals on the power line that are reflected back toward the power company as well as other customers. The harmonics are, thus, wasted power, as far as the customer is concerned. The unwanted harmonics can be removed using filters.

A third reduced power factor mechanism is energy in the form of spikes and harmonics generated out side of the customer's premises that are transmitted to the customer. Although, the spikes and harmonics travel through the power meter these spikes and harmonics cannot be usefully used by the customer, and may harm equipment.

SUMMARY

Exemplary embodiments described herein attempt to overcome the above discussed drawbacks of conventional systems. In particular, some of the embodiments herein attempt to reduce the power consumed by a load, increase the power factor of a load, reduce the harmonics and spikes generated by or sent to the customer, and reduce the electromagnetic interference (EMI) generated by or sent to the customer.

In one embodiment, a power factor adjustor comprises a power factor measurement unit configured to measure the power factor on an input line to a load and generate a power factor correction signal based on the measured power factor; and a power factor adjustment unit connected to the power factor measurement unit comprising: a fixed capacitor connected in series to a first switching device; and an adjustable element having a variable capacitance connected in parallel to the fixed capacitor and in series to a second switching device, wherein the overall capacitance of the power factor adjustment unit is adjusted by adjusting the capacitance of the adjustable element or by toggling the first and second switching devices in response to the power factor correction signal.

In another embodiment, an adjustable element comprises a container comprises a non-conducting material; a first electrode positioned in the container at a first end of the container, wherein the first electrode is movable within the container; a second electrode positioned in the container at a second end of the container; a compression material positioned in the container between the first and second electrodes; a first connection connected to the first electrode and a second connection connected to the second electrode for connection to a circuit; and a compression device attached to the first electrode that moves the first electrode toward the second electrode to apply compression to the compression material and thereby change the electrical properties of the adjustable element.

In yet another embodiment, an adjustable element comprises a container comprised of a non-conducting material; a first electrode positioned in the container at a first end of the container; a second electrode positioned in the container at a second end of the container; a compression material positioned in the container between the first and second electrodes; a first connection connected to the first electrode and a second connection connected to the second electrode for connection to a circuit; and a coil wound around the container to produce a magnetic field within the compression material thereby changing the electrical properties of the adjustable element.

In still yet another embodiment, a circuit comprises a capacitor; a first adjustable element connected to a first terminal of the capacitor and configured to adjust the electrical properties of the first adjustable element by compressing a compression material inside of the first adjustable element; and a second adjustable element connected to a second terminal of the capacitor and configured to adjust the electrical properties of the second adjustable element by compressing a compression material inside of the second adjustable element, wherein the first and second adjustable element adjust their electrical properties to control the charge discharged from the capacitor to a load.

In another embodiment, a filter comprises a harmonics detector configured to detect harmonics generated by a load and send a signal if harmonics are detected; and an adjustable element connected in parallel to a load and configured to adjust the Q factor of the adjustable element to suppress the harmonics in response to the signal sent from the harmonics detector.

In yet another embodiment, a method for power factor adjustment comprises measuring the power factor on an input line to a load by a power factor measurement unit; generating a power factor correction signal by the power factor measurement unit based on the measured power factor; receiving the power factor correction signal by a power factor adjustment unit that has a fixed capacitor connected in parallel to an adjustable element; toggling a first switching device connected in series to the fixed capacitor to adjust the capacitance of the power factor adjustment unit in response to the power factor correction signal; and adjusting the electrical properties of the adjustable element having a variable capacitance to further adjust the capacitance of the power factor adjustment unit in response to the power factor correction signal.

In still yet another embodiment, a power factor adjustment unit comprises a fixed capacitor connected in series to a switching device; and an adjustable element having a variable capacitance connected in parallel to the fixed capacitor, wherein the overall capacitance of the power factor adjustment unit is adjusted by adjusting the electrical properties of the adjustable element.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 13 illustrates an equivalent circuit for the adjustable element, according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Figure 1:
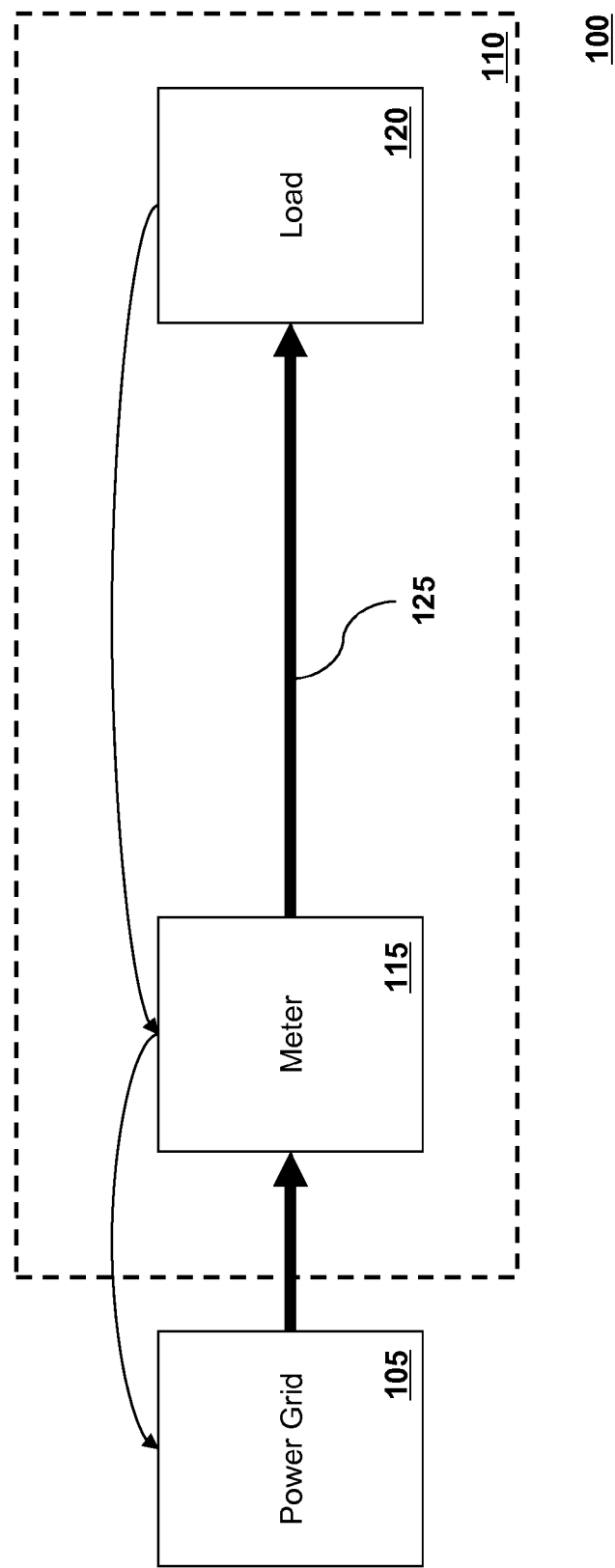
FIG. 1 illustrates a power system according to an exemplary embodiment.

FIG. 1 illustrates an exemplary power system 100. A power company supplies power to a power grid 105. The power is transmitted over the power grid 105 as electrical energy to a consumer 110. The consumer 110 has a meter 115 provided by the power company to measure the power consumed by the consumer 110. The power is consumed by one or more loads 120 operated by the consumer 110. Ideally, all the power supplied by the power grid 105 and metered by the meter 115 is consumed by the load 120. However, in practice, some of the power is reflected from the load back through the meter 115 to the power grid 105, some of the power is radiated from the wiring 125, and some of the power is wasted as heat in the wiring 125. Power transmitted to the load and reflected back to the power grid 105 causes heating of the wiring 125, both on the way to the load and as any power is reflected back.

Figure 2:
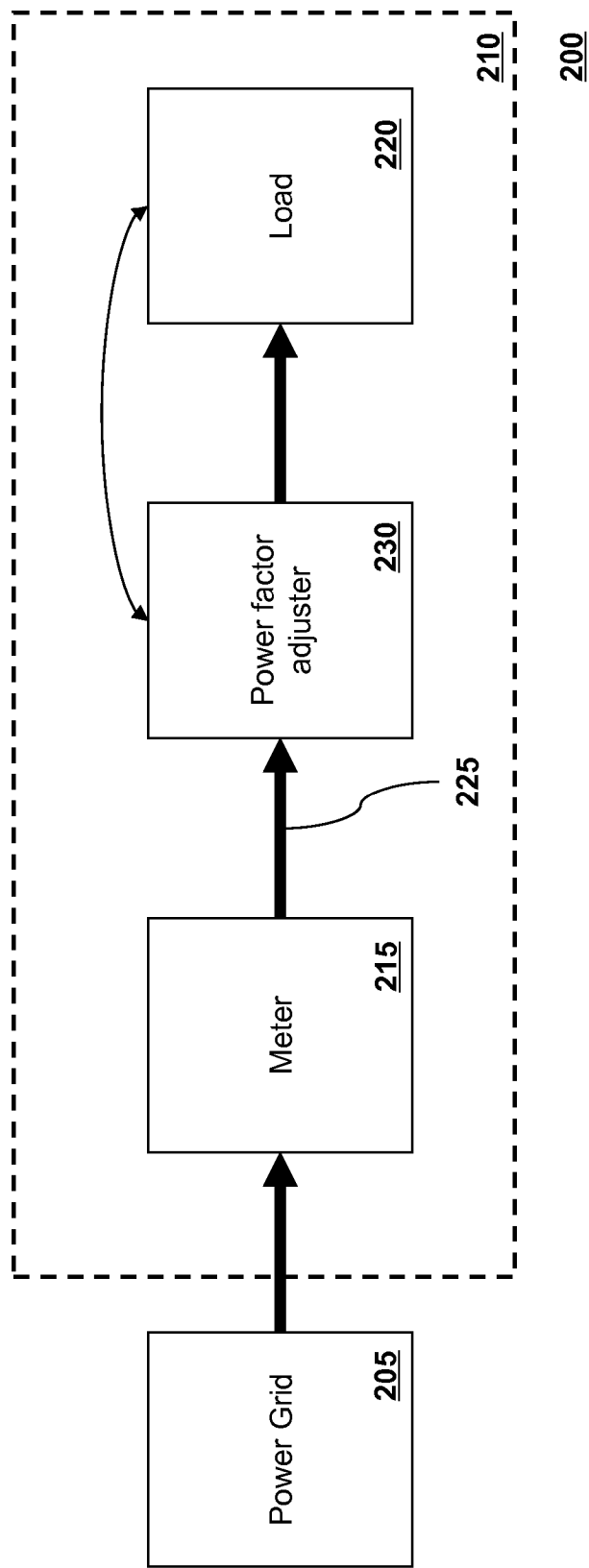
FIG. 2 illustrates a power system according to an exemplary embodiment.

FIG. 2 illustrates a power system 200, according to an exemplary embodiment. A power company supplies power to a customer 210 via power grid 205. The customer is metered by meter 215. Between the meter 215 and the load 220 is a power factor adjuster 230. The power factor adjuster 230 performs several functions, including recycling reflected power from the load back to the load and reducing the total power consumption of the load. The power factor adjuster can also filter the spikes and harmonics coming from the power grid before they reach the load, thereby preventing dissipation of harmonics and spikes in the load. Moreover, the power factor adjuster filters spikes and harmonics generated by the load. The power factor adjuster also reduces EMI due to filtering the spikes and harmonics that cause EMI.

When supplied with an alternating current (AC), resistive loads, for example, resisters, use all of the power supplied to the load. Reactive loads, however, that include capacitance, inductance, or some combination of capacitance and inductance, do not dissipate all of the power supplied to the load. The reactive components store energy at one period of the alternating current cycle and then release the energy during a subsequent period of the alternating cycle. The capacitance stores the energy in an electric field, whereas inductance stores the energy in a magnetic field. The released energy is reflected back along the wiring to the power grid. The reflected energy, thus, has to be unnecessarily transmitted to the load, and unnecessarily reflected back the power grid wasting energy in transmission losses in both directions. If the voltages and currents on the wiring 225 are observed, the power factor for pure capacitive or inductive loads is the cosine of the phase angle between the voltage and current in the wiring 225. If the voltage and current are exactly in phase, the power factor is one, and the power flowing to the load is the RMS voltage multiplied by the RMS current. If the voltage and current are 90° or 270° out of phase, then the power factor is zero, and no average power is supplied to the load. If the voltage and current are exactly out of phase, then power is flowing from the load to the grid. For the above combinations of pure inductive and pure capacitive loads, the RMS power supply to the load, P, is given by $$|P|=|S||\cos\theta|,$$

where S is the apparent power measured by the RMS voltage multiplied by the RMS current, and θ is the phase angle between the voltage and the currents on the wiring 225. Many different loads can have significant inductance, including motors, transformers, electromagnets, and solenoids. Loads that have significant capacitance are not so common. If an inductive load is coupled to a correctly sized capacitive load, the inductive and capacitive loads cancel the effects of one another by passing energy back and forth between the capacitive and inductive load. This prevents the energy from being reflected back to the power grid. The capacitor is sized so that the phase angle between the voltage and current is close to zero. The value of the capacitance depends on the inductance of the load and the resistance of the load and the capacitance of the load. For some loads, the values of the capacitance, the resistance, and the inductance are constant, but for most loads, the resistance and the inductance vary. For example, an unloaded motor has a high inductance an a high apparent resistance due to back electromotive force (EMF) generated by the motor as the rotor turns. As the motor is loaded, the apparent resistance drops as the back EMF is reduced. Thus, as the load on the motor changes, so does the value of the capacitor required. Although a capacitor can be sized for steady state conditions, the capacitor will not be the appropriate size if conditions change.

Figure 3:
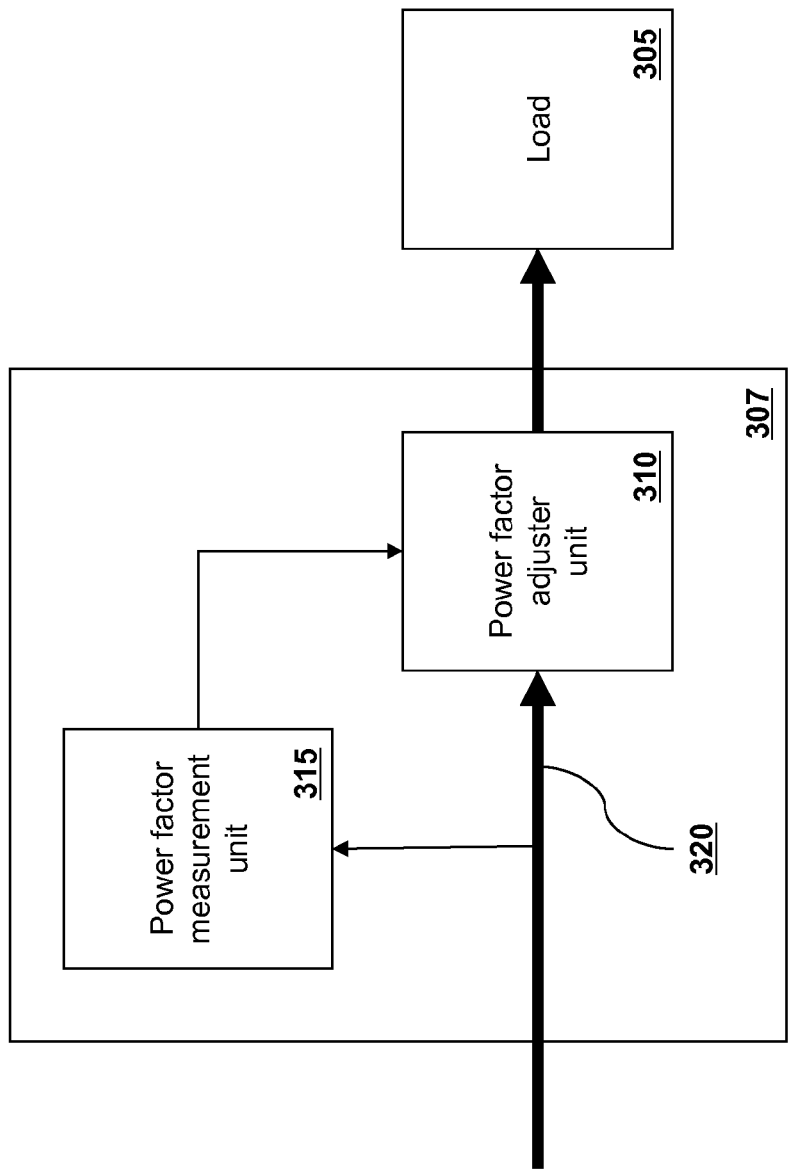
FIG. 3 illustrates a system for automatically adjusting power factor, according to an exemplary embodiment.

FIG. 3 illustrates a system 300 for automatically adjusting power factor according to an exemplary embodiment. The system 300 comprises a load 305, a power factor adjustment unit 310, and a power factor measurement unit 315. The power factor adjustment unit 310 and the power factor measurement unit 315 may be included in a power factor adjuster 307. The power factor measurement unit 315 measures the power factor on the input line 320. The measurement can be performed in a number of ways. For example, the current and voltage waveforms can be sampled, and phase angles can be calculated for the current and voltage. The phase angle between the current and the voltage is then calculated based on the difference between the phase angle of the current in the voltage. The power factor is the cosine of the difference angle. Alternatively, the current and voltage can be sampled, multiplied together, and averaged to find the power transmitted to the load. The real power can then be divided by the apparent power, S, to find the power factor. Based on the measured power factor, the power factor measurement unit 315 generates a power factor correction signal to correct for the power factor.

As illustrated in FIG. 3, the power factor measurement unit 315 is connected to the power factor adjustment unit 310 and sends power factor correction signal to the power factor adjustment unit 310. The power factor adjustment unit 310 adjusts a capacitance of the power factor adjustment unit 310 to reduce the power factor of the load 305.

The power factor measurement unit 315 can be adapted to adjust the signal sent to the power factor adjustment unit 310 in a number of ways. In some embodiments, the power factor measurement unit 315 is configured to measure the power factor on the input line 320 and calculate the exact capacitance required to correct the power factor. In some embodiments, the power factor measurement unit 315 and the power factor adjustment unit 310 form a control system. The power factor measurement unit 315 measures the power factor and calculates if the current capacitance provided by the power factor adjustment unit 310 is too high or too low. The power factor measurement unit 315, based on the above calculation, sends a signal to the power factor adjustment unit 310 that either (a) increases the capacitance provided by the power factor adjustment unit 310 if the capacitance is too low, or (b) decreases the capacitance provided by the power factor adjustment unit 310 if the capacitance is too high. In this manner, the control system 300 continuously adapts to changing power factors and loads. The control system 300 can be designed to be the stable when adjusting the power factor. The stabilization can be provided using, for example, dominant pole compensation.

In some embodiments, the power factor measurement unit 315 can be formed from discrete electronic components. In other embodiments, the power factor measurement unit 315 can be formed from an ASIC device, a programmable microcomputer chip, or a dedicated electronic chip.

Figure 4:
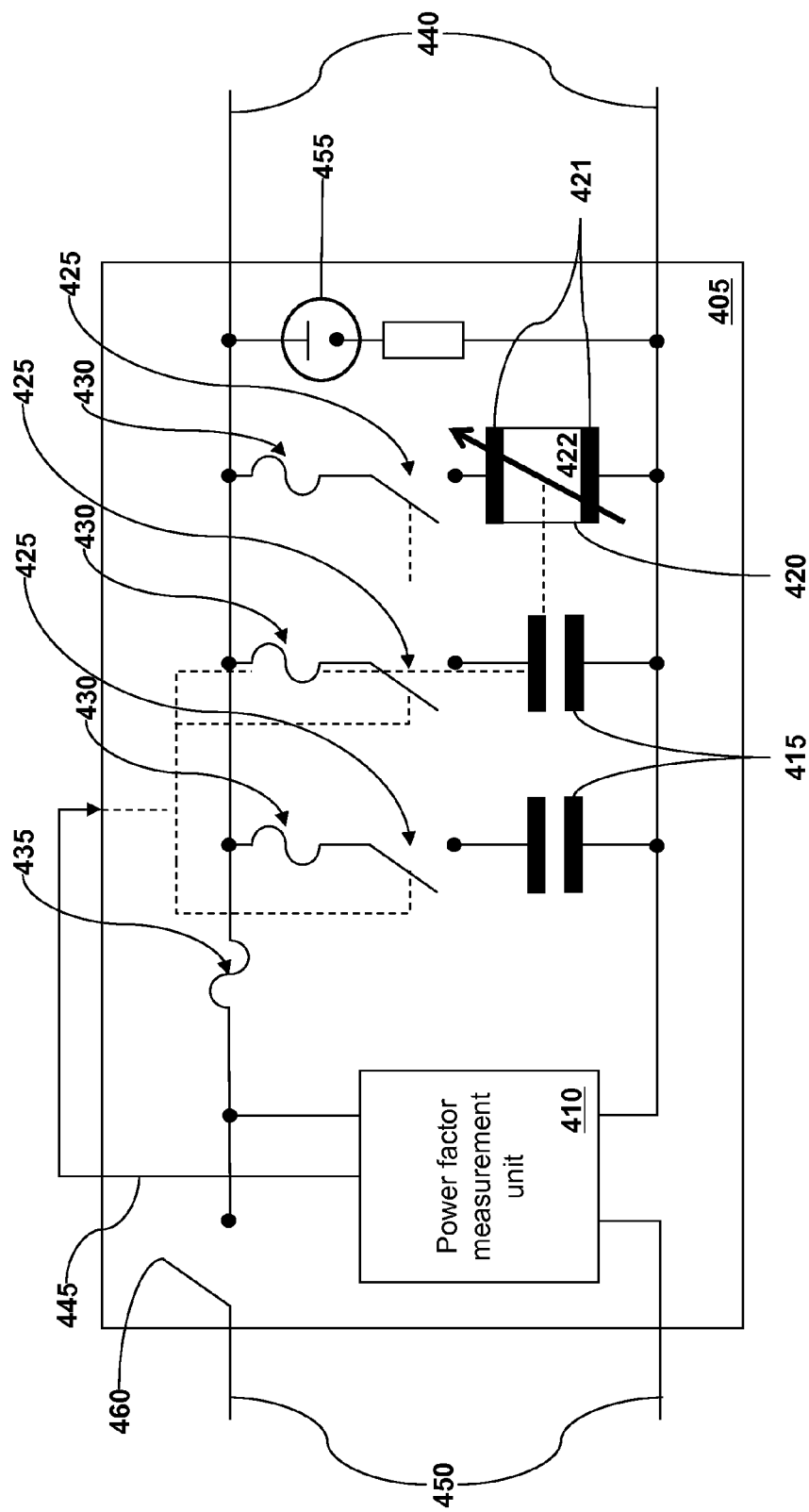
FIG. 4 illustrates the power factor adjustment unit, according to an exemplary embodiment.

FIG. 4 illustrates a power factor adjustment unit 405, according to an exemplary embodiment. In some embodiments, the power factor adjustment unit 405 contains a power factor measurement unit 410, similar to the power factor measurement unit 315. In other embodiments, the power factor measurement unit 410 is external to the power factor adjustment unit 405. In yet other embodiments, the power factor adjustment unit 405 is manually controlled by manual switches and adjustment knobs, and no power factor measurement unit 410 is required.

The power factor adjustment unit 405 comprises fixed capacitors 415 and an adjustable element 420. Although two capacitors are depicted in this exemplary embodiment, each of the one or more fixed capacitors 415 can have the same or different capacitance, such that switching a fixed capacitor can be in equal increments or other sized increments. Each fixed capacitor 415 is connected in series with at least one switch 425 and at least one optional fuse 430 across power supply lines 440 connected to a load. The adjustable element 420 is also connected in series with a switch 425 and an optional fuse 430. The switches 425 allow the fixed capacitors 415 and the adjustable element 420 to be switched in and out of the circuit. The fuses 430 protect the capacitors 415, a power supply connected to power input wiring 450, and the load from current surges.

In some embodiments, the switches 425 are mechanical switches, for example, relay switches, reed-relay switches, mechanical switches with solenoid actuators, or mechanical switches with motorized actuators. In other embodiments, the switches 425 are solid-state switches, for example, transistors, thyristors, triacs, or solid-state relays.

An additional fuse 435 protects all of the capacitors 415, the adjustable element 420, and the load from current surges. In some embodiments, the switches 425 are controlled manually. In other embodiments, the switches 425 are controlled by the power factor measurement unit 410 via wiring 445. In some embodiments, the adjustable element 420 is controlled manually. In other embodiments, the adjustable element 420 is controlled by the power factor measurement unit 410 via wiring 445.

An optional indicator 455 may be connected across the supply lines 440 and the output of the power factor adjustment unit 405. The optional indicator 455 allows an operator to see if the adjustment unit 405 is still in operation or if the fuse 435 has blown. Additional optional indicators may also be placed in parallel with the capacitors 415 and the adjustable element 420. The additional optional indicators allow an operator to see which switches 425 are closed and which fuses 430 may be blown. The indicator 435 and the additional indicators are mounted in the power factor adjustment unit 405, so that they are visible from the outside of any enclosure for the power factor adjustment unit 405. The optional indicators 455, 435 can be an LED light, gauge, a device that changes color upon a trigger, a device that physically moves upon a trigger, a device that extends upon a trigger, or another indicator device for displaying a status of the adjustment unit or fuse. In another embodiment, a display unit may replace the indicators 455, 435. The display unit may display the number of amps, volts, and watts that are being saved by the power factor adjustment unit 405 by connecting the power factor adjustment unit 405 to a load. The display unit may also display other important pieces of information about the power factor adjustment unit 405, such as the power factor correction value of the power factor adjustment unit 405 at any time. The display unit may also report that status of the power factor adjustment unit 405, including a failure or errors occurring within the power factor adjustment unit 405.

An optional power switch 460 may be placed in series with one or more power input wiring 450, thereby allowing the power to be switched off manually.

Depending upon which of the switches 425 are closed or open, the capacitance of the power factor adjustment unit 405 can be changed. The adjustable element 420 allows the power factor adjustment unit 405 to be adjusted to provide capacitance values in between capacitance values attainable by combinations of the capacitors 415. In this exemplary embodiment, the capacitors 415 range in value from about 1 μF to 100 μF. However, any value of capacitance compatible with embodiments of the disclose is within the scope of this disclosure.

In some embodiments, the power factor adjustment unit 405 does not contain any fixed capacitors 415, but rely solely on the capacitance of the adjustable element 420.

In some embodiments, the adjustable element 420 is a variable capacitor. In other embodiments, the adjustable element 420 is a variable inductor or a variable resistor. In yet other embodiments, the adjustable element 420 is an element that has adjustable resistance, capacitance, and inductance. In still yet other embodiments, the adjustable element 420 has adjustable nonlinear properties and may include elements the properties of which change in a nonlinear fashion as the voltage across or the current through the adjustable element change. The adjustable nonlinear properties of the adjustable element 420 may also exhibit hysteresis, in which the instant properties of the adjustable element 420 are dependent on the history of the current through and the voltage across the adjustable element 420. The adjustable element 420 has electrodes 421 at each end that are connected to a material 422 between the electrodes 421. The material 422 is responsible for the electrical properties of the adjustable element 420.

In operation, the power factor measurement unit 410 switches the switches 425 of the capacitors 415 to approximately adjust the power factor. Then, if necessary, the power factor measurement unit 410 causes adjustment of the adjustable element 420 using one of the methods described above to fine tune the adjustment unit 405. The switch 425 in series with the adjustable element 420 allows the adjustable element 420 to be prevented from affecting the circuit if, for example, the load attached to power supply lines 440 does not require any factor correction.

Figure 5:
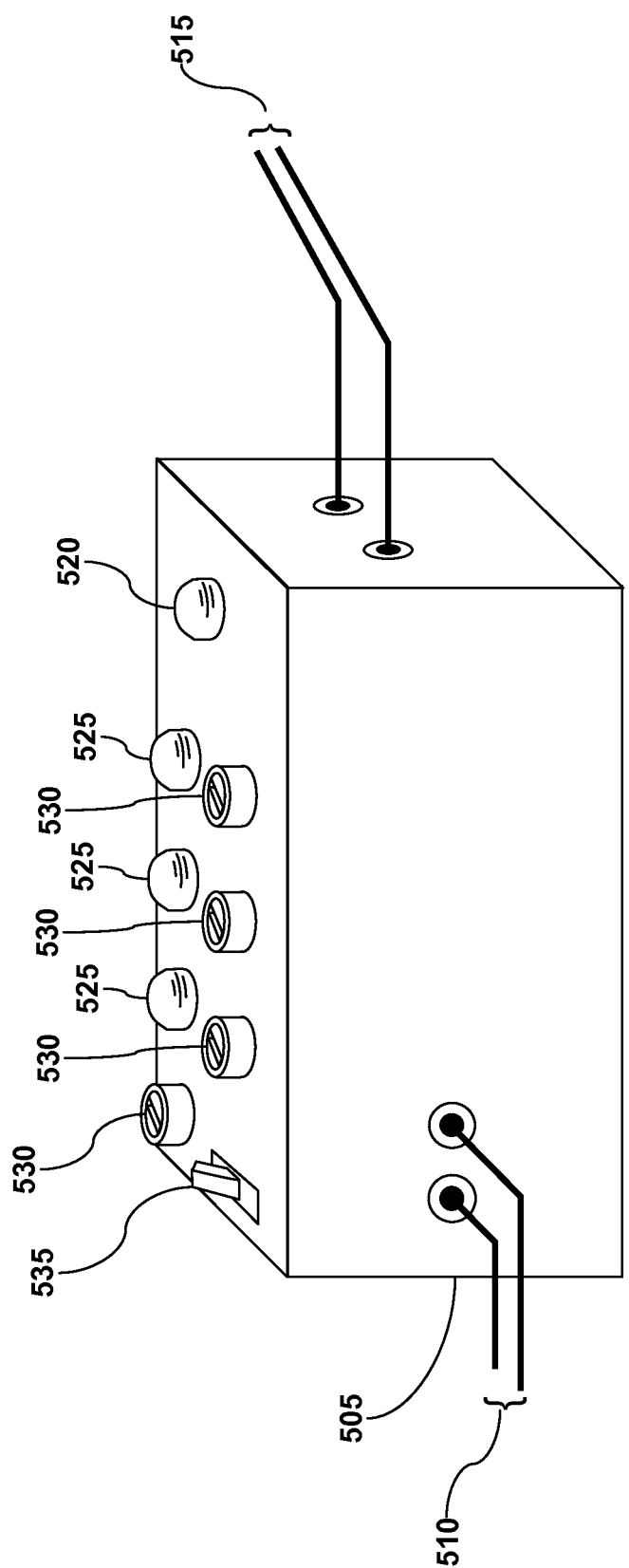
FIG. 5 illustrates an enclosure for a power factor adjustment unit, according to an exemplary embodiment.

FIG. 5 illustrates an enclosure 505 for the power factor adjustment unit 405, according to an exemplary embodiment. The input power wires 510 correspond to the power input wiring 450. The output wires 515 correspond to the power supply lines 440 connected to the load. An indicator 520 corresponds to the indicator 455 across power supply lines 440. Indicators 525 correspond to optional indicators placed across the capacitors 415 and the adjustable element 420 to indicate if the switches 425 are closed and the fuses 430 are not blown. Fuse holders 530 contain the fuses 430, 435 for easy replacement. Switch 535 corresponds to the optional main power switch 460.

Figure 6:
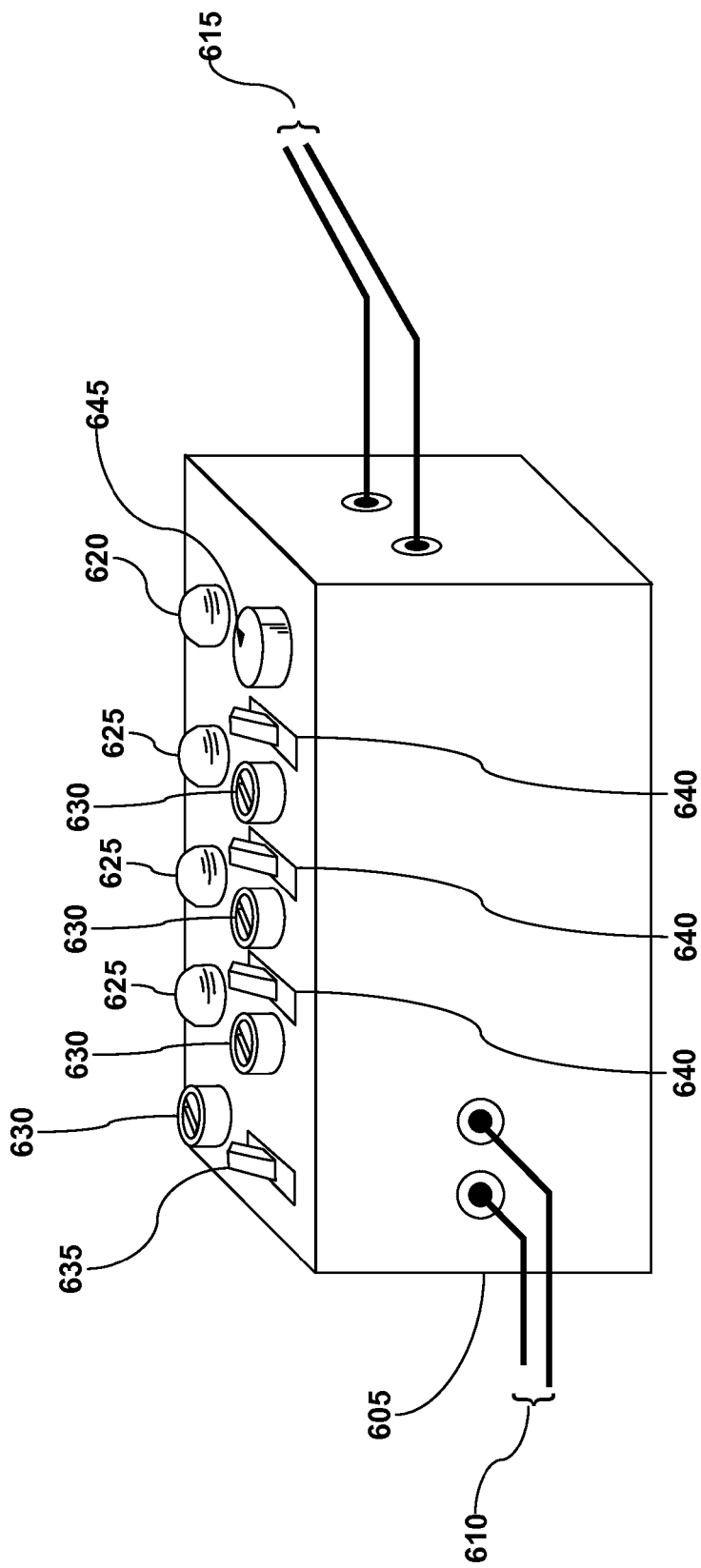
FIG. 6 illustrates an enclosure for a power factor adjustment unit that does not incorporate a power factor measurement unit, according to an exemplary embodiment.

FIG. 6 illustrates an enclosure 605 for a power factor adjustment unit that does not incorporate power factor measurement unit 410. The input power wires 610 correspond to the power input wiring 450. The output wires 615 correspond to the power supply lines 440 connected to the load. An indicator 620 corresponds to the indicator 455 across power supply lines 440. Indicators 625 correspond to optional indicators placed across the capacitors 415 and the adjustable element 420, to indicate if the switches 425 are closed and the fuses 430 are not blown. Fuse holders 630 contain the fuses 430, 435 for easy replacement. Switch 635 corresponds to the optional main power switch 460. In the enclosure 605, the switches 425 correspond to manual mechanical switches 640 on the outside of the enclosure 605. Adjustable element 420 is controlled by adjustment knob 645.

The adjustment knob 645 may be directly attached to the adjustable element 420 and can be used to mechanically adjust parameters of the adjustable element 420. Alternatively, the adjustment knob 645 may be connected to an electronic adjustment circuit. The electronic adjustment circuit may convert the position of the adjustment knob 645 into a voltage or a current supplied to the adjustable element 420. The adjustment circuit may also supply signals to an actuator that mechanically adjusts parameters of the adjustable element 420.

Figure 7:
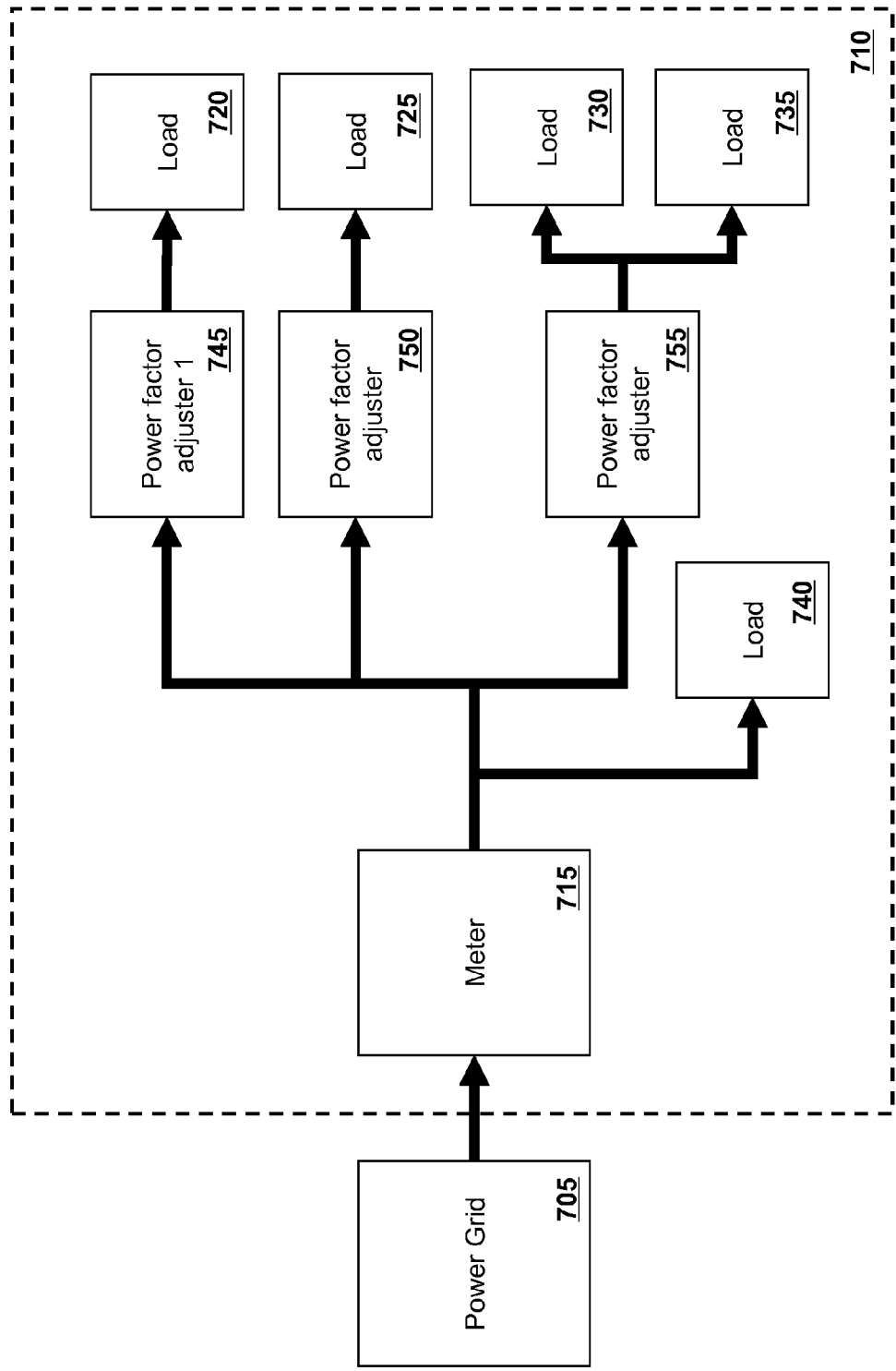
FIG. 7 illustrates an exemplary installation of several power factor adjusters, according to an exemplary embodiment.

A power factor adjuster can be placed in a number of locations in the power system of a facility. FIG. 7 illustrates an exemplary installation of several power factor adjusters, according to an exemplary embodiment. A facility 710 is fed power by power grid 705. A meter 715, meters the power flowing into the facility 710 to loads 720-740. Power factor adjuster 745 is mounted in close proximity to a load 720 and corrects the power factor of load 720 to be close to unity. The power factor adjuster 750 is mounted in close proximity to the load 725 and corrects the power factor of load 725 to be close to unity. The power factor adjuster 755 is mounted in close proximity to loads 730 and 735. Power factor adjuster 755 corrects the power factor of the combined loads 730 and 735 to be close to unity. Thus, the overall power factor seen at the meter 715 appears close to unity because each of the loads 720-735 is corrected. As in FIG. 7, a power factor adjuster can be connected between a load and the remaining power system, for example, loads 720, 725. Alternatively, more than one load, for example, loads 730, 735 can be corrected simultaneously by a single power factor adjuster, for example, power factor adjuster 750. Some loads, for example, load 740, have a power factor that is already close to unity and, therefore, does not require a power factor adjuster. In general, any combination of load may be corrected by one or more power factor adjusters, the power factor adjusters being placed close to a single load in some instances and correcting multiple loads in other instances.

The power factor adjusters 745-755 can be physically placed in a case or enclosure of the corresponding load 720-735, the switchbox for the corresponding load 720-735, or at any position along the wiring to the corresponding load 720-735. The power factor adjuster can be a separate component, integrated with original equipment manufacturer components, or added as an aftermarket component.

Each of the power factor adjusters 745-755 may be configured to monitor the amount of power, voltage, and amperage drawn by the corresponding loads 720-735. The power factor adjusters 745-755 may be programmed with an acceptable range for each of the corresponding loads 720-735. The acceptable range may be a low and high threshold values of a voltage, amperage, or wattage drawn by the loads 720-735 under normal operating conditions. If the loads 720-735 are not operating within the acceptable range, the loads may be malfunctioning. The power factor adjusters 745-755 may also include a communication device configured to sends a message to another device when the corresponding load 720-735 are not operating within the acceptable range. The communication device may transmit messages through wired or wireless communication methods, for example WiFi, Bluetooth, radio frequencies, infrared, or any other communication method to send a message.

Figure 8:
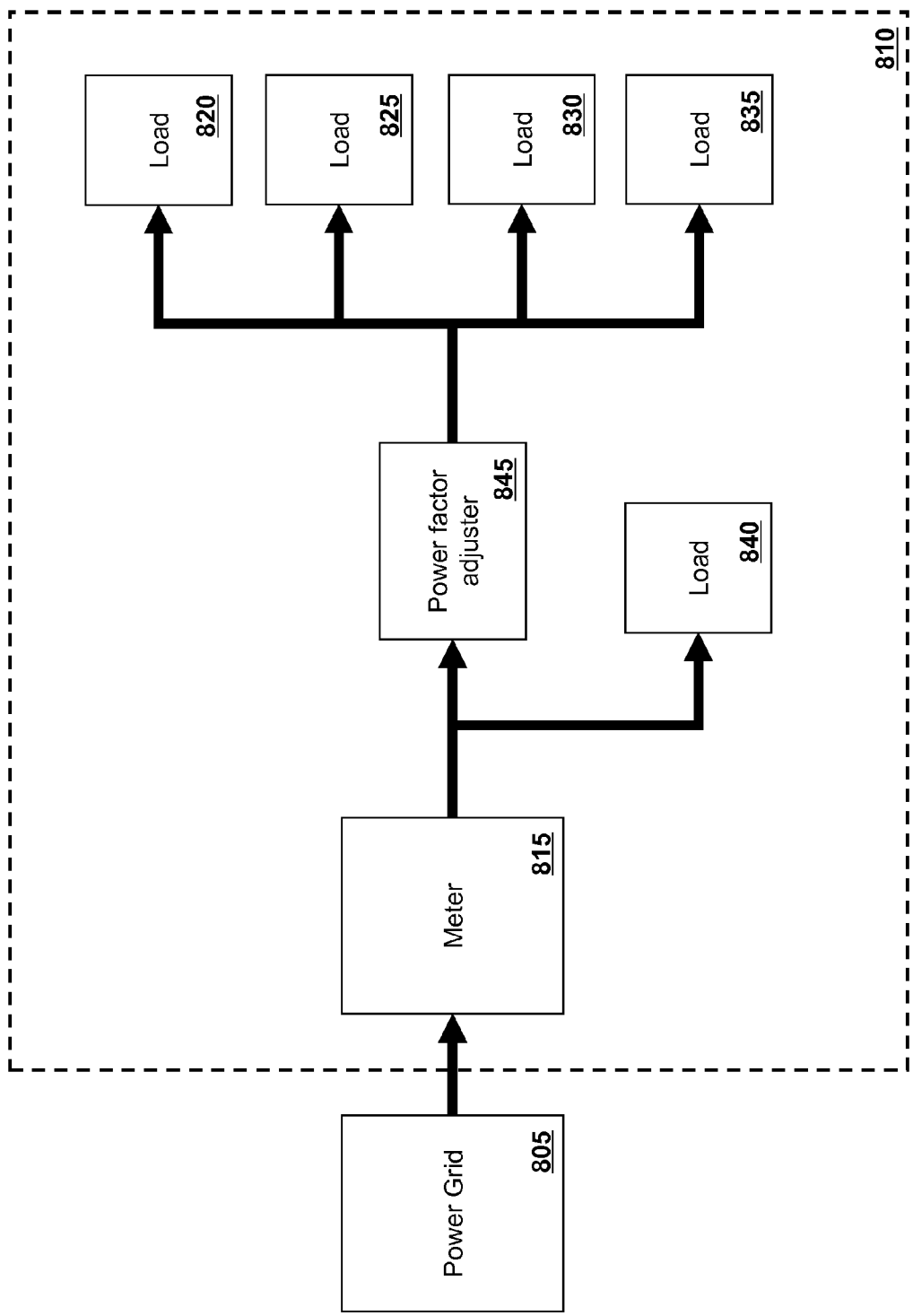
FIG. 8 illustrates an exemplary use of a single power factor adjuster for multiple loads, according to an exemplary embodiment.

FIG. 8 illustrates an exemplary use of a single power factor adjuster for multiple loads, according to an embodiment. A facility 810 is powered by power grid 805. A meter 815 can meter the power flowing into the facility 810 to loads 820-840. A power factor adjuster 845 corrects the power factor of the combined loads 820-835. Load 840 has a power factor that is already close to unity and, therefore, does not require a power factor adjuster and is connected directly to the meter 815.

The power factor adjuster 845 can be physically placed in a case or enclosure of any of the loads 820-835, the switchbox for of any of the loads 820-835, or at any position along the wiring to of any of the loads 820-835. The power factor adjuster can be a separate component, integrated with original equipment manufacturer components, or added as an aftermarket component.

In addition to power factor adjustment, the power factor adjustor 845 may be used as a circuit breaker. The power factor adjustor 845 may be configured to detect a fault condition and immediately discontinue electrical flow to the loads 820-835 when the fault condition is detected.

In addition, the power factor adjustor 845 may adjust the power factor of a load receiving three-phase power. In order to account for three-phase power, the power factor adjustor 845 comprises three power factor adjustors each connected to one of the three circuit conductors carrying the three phases of the three-phase power. Using three power factor adjustors, the power factor adjustor 845 may receive up to 480V of three-phase power from the power grid 805.

Figure 9:
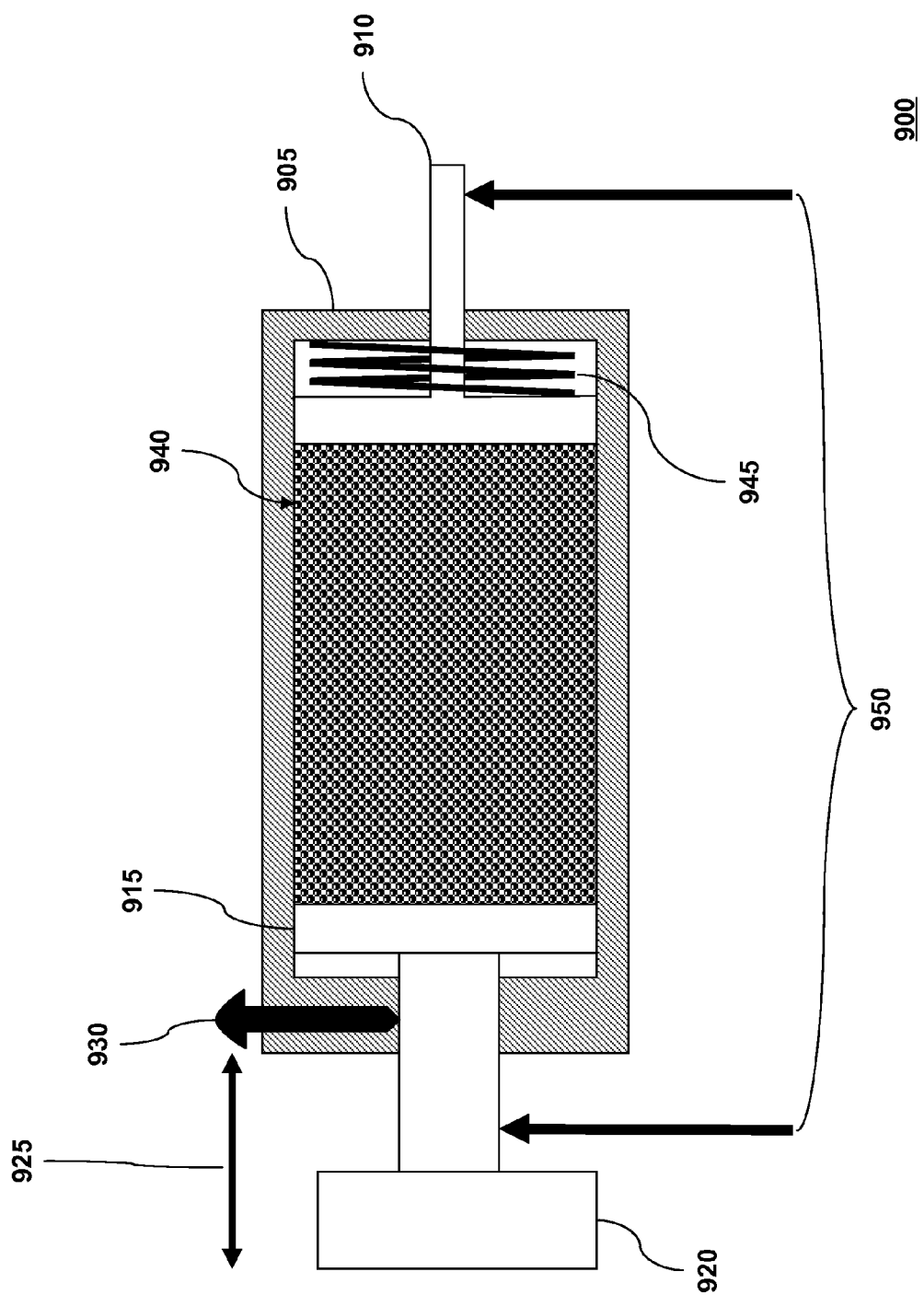
FIG. 9 illustrates an adjustable element, according to an exemplary embodiment.

FIG. 9 illustrates an adjustable element 900, according to an exemplary embodiment. The adjustable element 900 can be used as the adjustable element 420 shown in FIG. 4 and can be configured to operate without the use of the fixed capacitors 415. The adjustable element 900 comprises a container 905. The container 905 may be made from any non-conducting material, for example, nylon, polycarbonate, polyethylene, polypropylene, Teflon, alumina, glass, resin, fiberglass resin, Bakelite, or any other insulating material compatible with embodiments of the disclosure. The container 905 has electrodes 910, 915 positioned at each end. In some embodiments, both of the electrodes 910, 915 are fixed. In other embodiments, one of the electrodes is fixed, and the other electrode is movable. In yet other embodiments, 910, 915 are both movable. In some embodiments, one of the electrodes, for example, electrodes 910, as shown in FIG. 9, has a spring 945 between the inside of the container 905 and the electrodes 910. The spring provides pressure on the back of the electrodes 910, pushing the electrode 910 toward the electrode 915. The spring 945 makes adjustment of the compression of a material 940 between the electrodes 910 and 915 more reliable.

The electrodes 910, 915 may be made from copper, gold, silver, palladium, platinum, ruthenium, nickel, iron, aluminum, tungsten, titanium, titanium nitrite, tantalum, tantalum nitride, chromium, lead, cadmium, zinc, manganese, lithium cobalt oxide, lithium iron phosphate, lithium manganese oxide, nickel oxyhydroxide, or any combination of the above or any other metals compatible with embodiments of the disclosure. The electrodes maybe formed of one or more of the above metals and then coated in a second of the above metals. The electrodes 910, 915 may also be made of semiconductor materials, for example, carbon in the form of diamond or graphite, silicon, silicon carbide, germanium or any combination of those semiconductors with each other, or with one of the above metals. In some embodiments, the electrodes 910, 915 are made of the same material. In other embodiments, the electrodes 910, 915 are made of different materials.

Electrode 915 is movable using compression device 920. Pushing or pulling the compression device 920 in the direction of the arrows 925 causes the compression device 920 to slide through a hole in the container 905 in the direction of arrows 925. The compression device 920 is attached to the moving electrode 915 and pushes the moving electrode 915 toward or away from electrode 910.

Between the electrodes 910 and 915 a material 940 is placed. The material 940 is compressed by moving electrode 915 toward electrodes 910, as discussed above. The material 940 allows current to flow between the electrodes 910, 915 and is responsible for the electrical properties of the adjustable element 900. Compressing the material 940 changes the electrical properties.

A set screw 930 is placed in a threaded hole in the container 905. The set screw 930 in the container 905 extends from the outside of the container and through the hole in the container in which the compression device 920 is placed. When the current compression device has been positioned so that the correct electrical properties for the adjustable element 900 are achieved, the set screw 930 can be tightened against the compression device 920, thereby preventing the compression device from moving. Connections 950 to the electrodes 910, 915 via compression device 920 allow the adjustable element 900 to be connected in the circuit, for example, as adjustable element 420 in FIG. 4.

In some embodiments, the material 940 comprises powdered magnetite ($Fe_3O_4$ or $FeO.Fe_2O_3$). In some embodiments, powdered magnetite is the only material in between the electrodes 910, 915. In some embodiments, the powdered magnetite is mixed with liquid. The liquid may be a mineral oil, synthetic oil, a liquid electrolyte, or semi-solid electrolyte. In some embodiments, the powdered magnetite is mixed with other powdered materials. The other powdered materials may include carbon as graphite or diamond, quartz, sapphire, beryl, gold, copper, silver, platinum, palladium, nickel, molybdenum, aluminum, molybdenum disulfide, titanium disulfide, silica, corundum, powdered rare earth magnetic materials, or any other powdered material compatible with embodiments of this disclosure. The materials maybe in either crystalline, polycrystalline or amorphous form. For example, the material 940 may include half magnetite and half carbon. In some embodiments, no magnetite powder is included, and only one or more of the above powdered materials other than magnetite is included in the container 905. In some embodiments, the magnetite and/or other powdered material is positioned between the electrodes in a hardened resin. In other embodiments, the material may be heated before use to adjust the electrical properties of the material.

Figure 10:
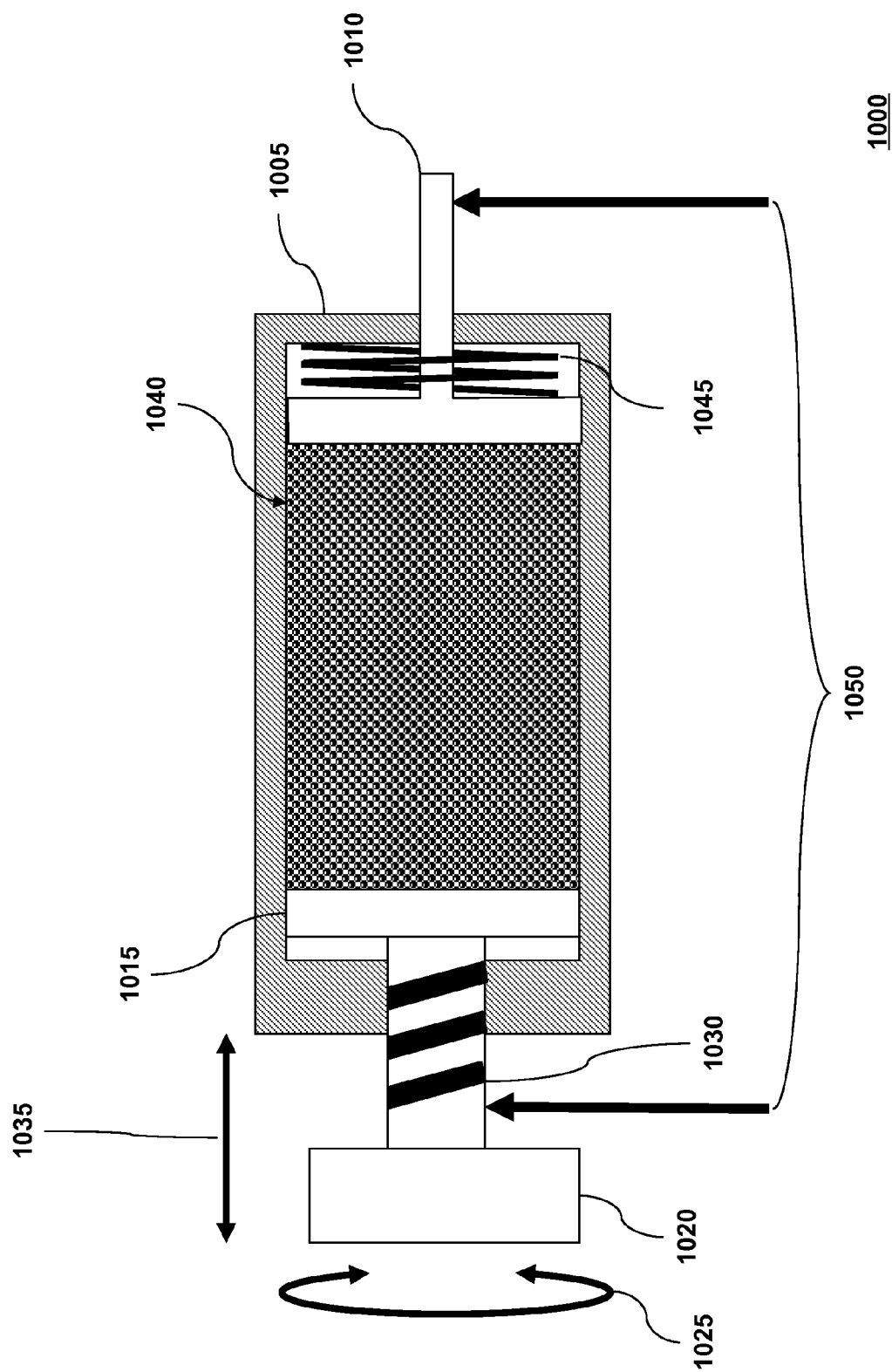
FIG. 10 illustrates an adjustable element, according to another exemplary embodiment.

FIG. 10 illustrates an adjustable element 1000, according to another embodiment. The adjustable element 1000 can be used as the adjustable element 420 in FIG. 4. The adjustable element 1000 comprises a container 1005. The container 1005 may be made from any non-conducting material, for example, nylon, polycarbonate, polyethylene, polypropylene, Teflon, alumina, glass, resin, fiberglass resin, Bakelite, or any other insulating material compatible with embodiments of the disclosure. The container 1005 has electrodes 1010, 1015 positioned at each end. In some embodiments, both of the electrodes 1010, 1015 are fixed. In other embodiments, one of the electrodes for example, electrodes 1010 and the other electrode is movable. In yet other embodiments, 1010, 1015 are both movable. In some embodiments, one of the electrodes, for example, electrodes 1010, as shown in FIG. 10, has a spring 1045 between the inside of the container 1005 and the electrodes 1010. The spring provides pressure on the back of the electrode 1010, which pushes the electrode 1010 toward the electrode 1015. The spring 1045 can allow for adjustment of the compression of a material 1040 between the electrodes 1010 and 1015 to be more reliable.

The electrodes 1010, 1015 may be made from copper, gold, silver, palladium, platinum, ruthenium, nickel, iron, aluminum, tungsten, titanium, titanium nitrite, tantalum, tantalum nitride, chromium, lead, cadmium, zinc, manganese, lithium cobalt oxide, lithium iron phosphate, lithium manganese oxide, nickel oxyhydroxide, or any combination of the above or any other metals compatible with embodiments of the disclosure. The electrodes maybe formed of one of the above metals and then coated in a second of the above metals. The electrodes 1010, 1015 may also be made of semiconductor materials, for example, carbon in the form of diamond or graphite, silicon, silicon carbide, germanium or any combination of those semiconductors with each other, or with one of the above metals.

Electrode 1015 is movable using compression device 1020. Turning the compression device 1020 in the direction of the arrows 1025 causes screws thread 1030 that engages with a threaded hole in the container 1005 to move in the direction of arrows 1035. The compression device 1020 is attached to the moving electrode 1015. The compression device 1020 pushes electrode 1015 toward or away from electrode 1010.

A material 1040 is placed between the electrodes 1010, 1015. The material 1040 is compressed by moving electrode 1015 toward electrode 1010, as discussed above. The material 1040 allows current to flow between the electrodes 1010, 1015 and is responsible for the electrical properties of the adjustable element 1000. Compressing the material 1040 changes the electrical properties.

Connections 1050 to the electrodes 1010 and 1015 via compression device 1020, allow the adjustable element 1000 to be connected in the circuit, for example, as adjustable element 420 in FIG. 4.

In some embodiments, the material 1040 comprises powdered magnetite. In some embodiments, powdered magnetite is the only material in between the electrodes 1010, 1015. In some embodiments, the powdered magnetite is mixed with liquid. The liquid may be a mineral oil, synthetic oil, a liquid electrolyte, or semi-solid electrolyte. In some embodiments, the powdered magnetite is mixed with other powdered materials. The other powdered materials may include carbon as graphite or diamond, quartz, sapphire, beryl, gold, copper, silver, platinum, palladium, nickel, molybdenum, aluminum, molybdenum disulfide, titanium disulfide, silica, corundum, powdered rare earth magnetic materials, or any other powdered material compatible with embodiments of this disclosure. The materials maybe in either crystalline, polycrystalline or amorphous form. For example, the material 1040 may include half magnetite and half carbon. In some embodiments, no magnetite powder is included, and only one or more of the above powdered materials other than magnetite is included in the container 1005. In some embodiments, the magnetite and/or other powdered material is positioned between the electrodes in a hardened resin. In other embodiments, the material may be heated before use to adjust the electrical properties of the material.

Figure 11:
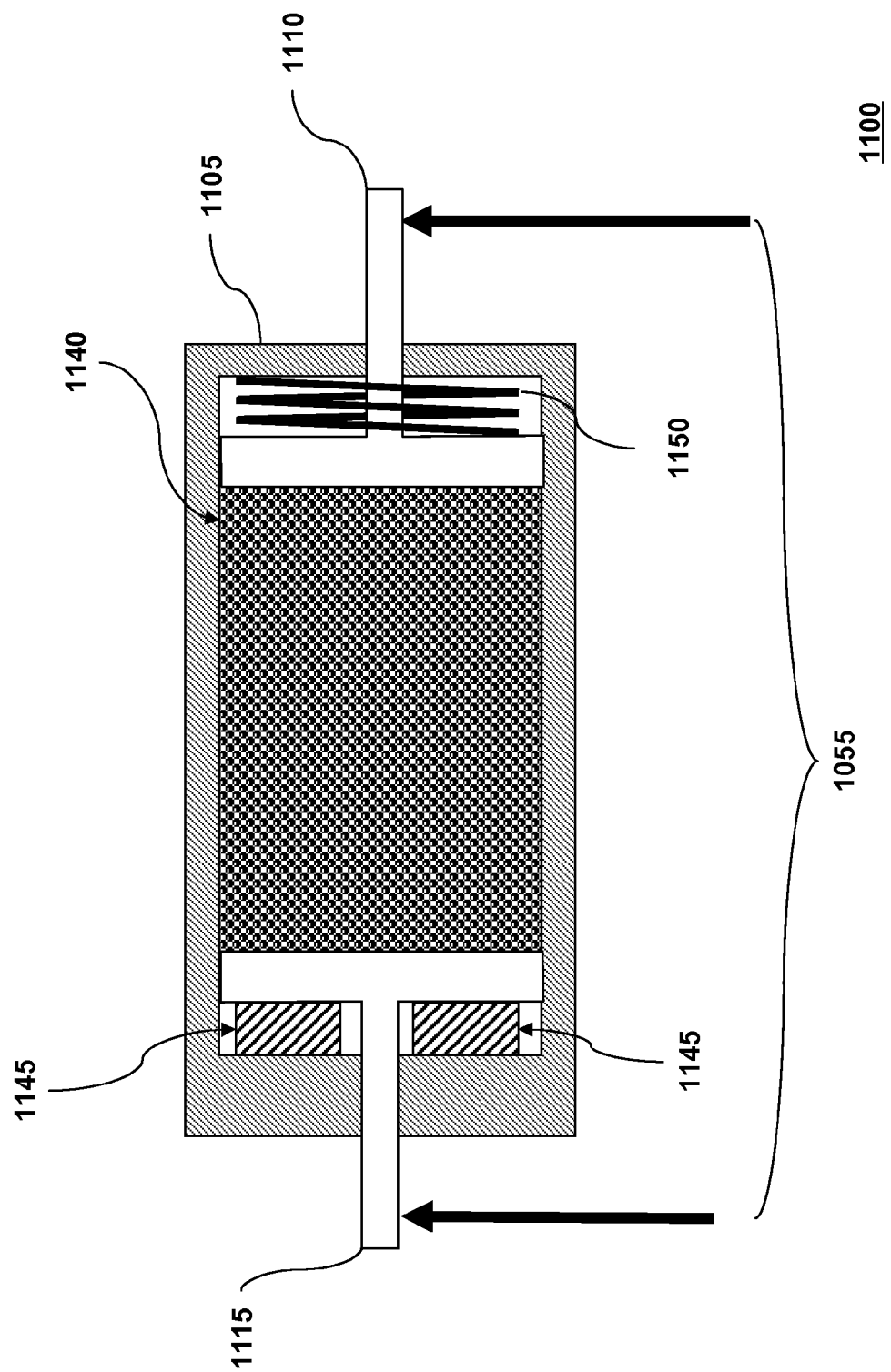
FIG. 11 illustrates an adjustable element, according to yet another exemplary embodiment.

Alternatively, FIG. 11 illustrates another adjustable element 1100, according to an exemplary embodiment. The adjustable element 1100 can be used as the adjustable element 420 in FIG. 4. The adjustable element 1100 comprises a container 1105. The container 1105 has electrodes 1110, 1115 positioned at each end. As illustrated in FIG. 11, the compression device 920 or 1020 of FIGS. 9 and 10, respectively, is replaced by a different compression device, for example, a piezoelectric actuator 1145. Piezoelectric actuator 1145 may be placed between the electrode 1115 and the inside of the container 1105 to push the electrode 1115 toward or away from the electrode 1110. Alternatively, a magnetic actuator may be used instead of piezoelectric actuator 1145. The magnetic actuator is placed between the electrode 1115 and the inside of the container 1105 to push electrode 1115 toward or away from electrode 1110. In yet another embodiment, a permanent magnet may be used instead of piezoelectric actuator 1145. The permanent magnet is placed between electrode 1115, and the inside of the container 1105. A second permanent magnet outside of the container may be positioned by an actuator to attract or repel the permanent magnet inside the container, thus, pushing the electrode 1115 toward or away from electrode 1110.

In some embodiments, one of the electrodes, for example, electrodes 1110, as shown in FIG. 11, has a spring 1150 between the inside of the container 1105 and the electrodes 1110. The spring provides pressure on the back of the electrode 1110, pushing the electrode 1110 toward the electrode 1115. The spring 1150 makes adjustment of the compression of a material 1140 between the electrodes 1110 and 1115 more reliable.

The electrodes 1110, 1115 may be made from copper, gold, silver, palladium, platinum, ruthenium, nickel, iron, aluminum, tungsten, titanium, titanium nitrite, tantalum, tantalum nitride, chromium, lead, cadmium, zinc, manganese, lithium cobalt oxide, lithium iron phosphate, lithium manganese oxide, nickel oxyhydroxide, or any combination of the above or any other metals compatible with embodiments of the disclosure. The electrodes maybe formed of one of the above metals and then coated in a second of the above metals. The electrodes 1110, 1115 may also be made of semiconductor materials, for example, carbon in the form of diamond or graphite, silicon, silicon carbide, germanium or any combination of those semiconductors with each other, or with one of the above metals.

Connections 1155 to the electrodes 1110 and 1115 via compression device 1120 allow the adjustable element 1100 to be connected in the circuit, for example, as adjustable element 420 in FIG. 4.

In some embodiments, the material 1140 comprises powdered magnetite. In some embodiments, powdered magnetite is the only material in between the electrodes 1110 and 1115. In some embodiments, the powdered magnetite is mixed with liquid. The liquid may be a mineral oil, synthetic oil, a liquid electrolyte, or semi-solid electrolyte. In some embodiments, the powdered magnetite is mixed with other powdered materials. The other powdered materials may include carbon as graphite or diamond, quartz, sapphire, beryl, gold, copper, silver, platinum, palladium, nickel, molybdenum, aluminum, molybdenum disulfide, titanium disulfide, silica, corundum, powdered rare earth magnetic materials, or any other powdered material compatible with embodiments of this disclosure. The materials maybe in either crystalline, polycrystalline or amorphous form. For example, the material 1140 may include half magnetite and half carbon. In some embodiments, no magnetite powder is included, and only one or more of the above powdered materials other than magnetite is included in the container 1105. In some embodiments, the magnetite and/or other powdered material is positioned between the electrodes in a hardened resin. In other embodiments, the material may be heated before use to adjust the electrical properties of the material.

An alternative actuation system can be constructed by using an actuator to turn the compression device 1020 (FIG. 10) to compress the powder. Possible actuators include, a stepper motor or geared motor to turn the compression device 1020.

Figure 12:
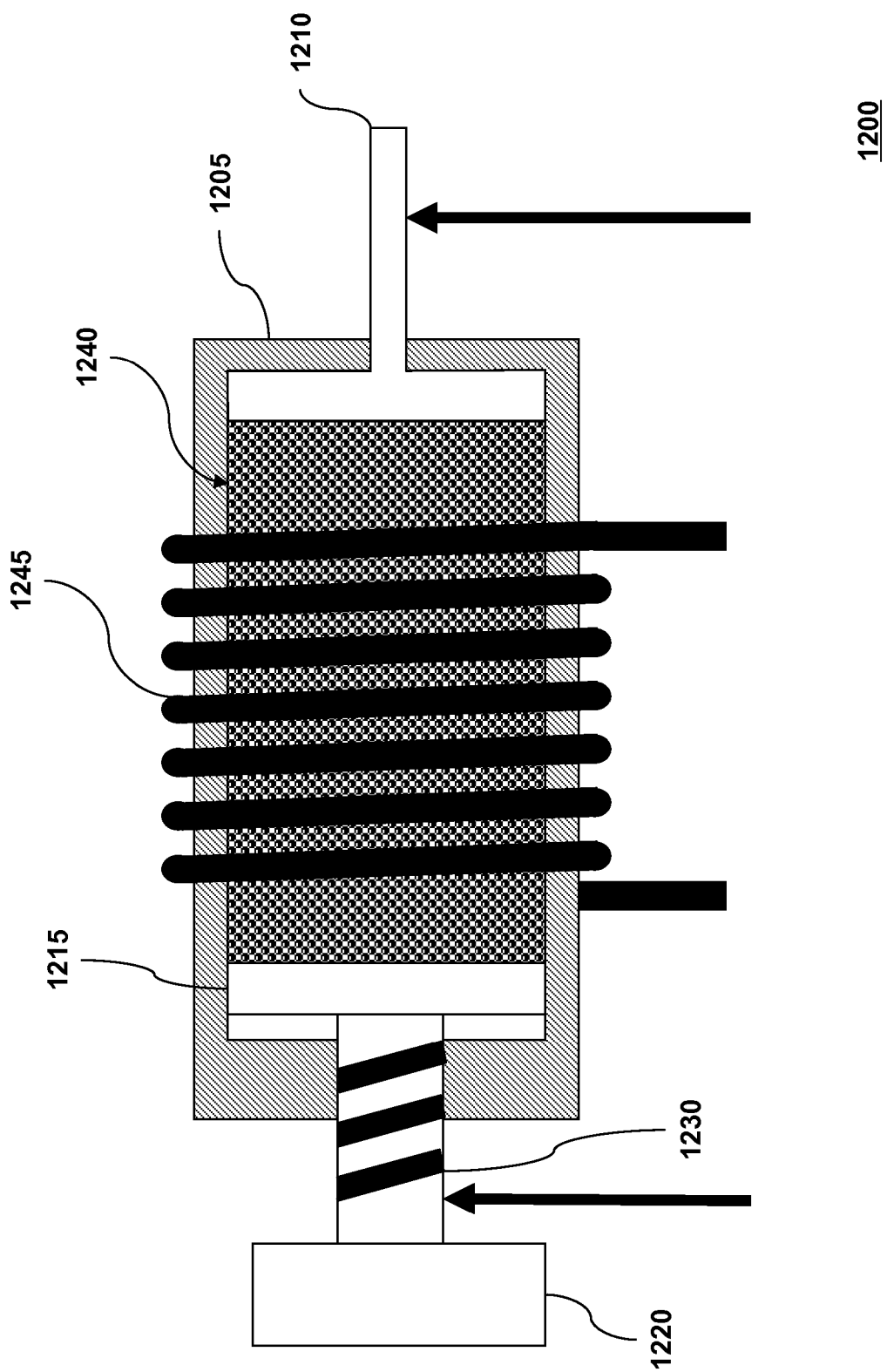
FIG. 12 illustrates an adjustable element, according to yet another exemplary embodiment.

FIG. 12 illustrates an adjustable element 1200, according to an embodiment. The adjustable element 1200 can be used as the adjustable element 420 in FIG. 4. The adjustable element 1200 comprises a container 1205. The container 1205 has electrodes 1210, 1215 positioned at each end and a compression device 1220. As illustrated in FIG. 12, a coil 1245 is wound around the container 1205. A current can be passed through the coil 1245, thereby producing a magnetic field within the magnetite powder material 1240 in the container 1205. The additional magnetic field generated by the current and the coil 1245 causes the powder to be magnetized. The magnetized magnetite powder has different inductive properties than the non-magnetized magnetite powder. Thus, application of the current through the coil 1245 changes, the inductive properties of the adjustable element. Further, the magnetized magnetite powder particles are attracted to other magnetized magnetite powder particles, causing the powder to compress. The compression causes the resistance and the capacitance of the adjustable element change. Alternatively, rather than using the coil 1245, the magnetic field can be provided by an external electromagnet or permanent magnet. The position of the permanent magnet or the electromagnet can be adjusted to change the intensity and direction of the magnetic field through the adjustable element. Further, the current through the electromagnet can be used to adjust the intensity of the magnetic field.

An actuation system can be constructed by using an actuator to turn the compression device 1220 to compress the powder. Possible actuators include, a stepper motor or geared motor to turn the compression device 1220. The stepper motor or geared motor can be controlled by signals from the power factor measurement unit 410 provided by wiring 445.

Thus, by adjusting one or more of the compression of the powder between the electrodes 1210, 1215 or the current through the coil 1245 and the inductance, capacitance and resistance of the adjustable element can be changed. The adjustment unit 405 can thus, be adjusted to correct the power factor of the load attached to power supply lines 440. The control signals from the power factor measurement unit 410 provided by wiring 445 can be used to control any actuator used for compression of the magnetite powder material 1240 or to control the current through the coil 1245.

The coil 1245 may be combined with any of the embodiments described above in FIGS. 9-11. Further, the coil 1245 maybe the formed around a container that has no other adjustment means and is filled with powdered material 1240.

Connections 1250 to the electrodes 1210 and 1215 via compression device 1220, allow the adjustable element 1200 to be connected in the circuit, for example, as adjustable element 420 in FIG. 4.

In some embodiments, the material 1240 comprises powdered magnetite. In some embodiments, powdered magnetite is the only material in between the electrodes 1210, 1215. In some embodiments, the powdered magnetite is mixed with liquid. The liquid may be a mineral oil, synthetic oil, a liquid electrolyte, or semi-solid electrolyte. In some embodiments, the powdered magnetite is mixed with other powdered materials. The other powdered materials may include carbon as graphite or diamond, quartz, sapphire, beryl, gold, copper, silver, platinum, palladium, nickel, molybdenum, aluminum, molybdenum disulfide, titanium disulfide, silica, corundum, powdered rare earth magnetic materials, or any other powdered material compatible with embodiments of this disclosure. The materials maybe in either crystalline, polycrystalline or amorphous form. For example, the material 1240 may include half magnetite and half carbon. In some embodiments, no magnetite powder is included, and only one or more of the above powdered materials other than magnetite is included in the container 1205. In some embodiments, the magnetite and/or other powdered material is positioned between the electrodes in a hardened resin. In other embodiments, the material may be heated before use to adjust the electrical properties of the material.

In some embodiments, the magnetite powder, or mixture of powders is placed in a container, for example, containers 905, 1005, 1105, 1205. When the container is filled, the magnetite powder, or mixture of powders is subject to a magnetic field. The magnetic field is provided by a coil, for example, coil 1245, an external electromagnet, or a permanent magnet. In some embodiments, the magnetite powder, or mixture of powders is compressed, by one of the methods discussed above, while the magnetic field is applied. In other embodiments, the magnetite powder or mixture of powders is compressed, by one of the methods discussed above, after the magnetic field is removed. In another embodiment, the magnetic field is applied to the magnetite powder or mixture of powders before compression.

In some embodiments, the magnetite powder, or mixture of powders is mixed with a resin, for example, epoxy resin, polyurethane resin, polyester resin, acetal resin or methyl methacrylate resin. The powder resin mixture is placed in a container, for example, containers 905, 1005, 1105, 1205. The resin powder is then compressed using a one of the compression devices discussed above until one or more desired electrical properties of the composite powder and resin are achieved. When the electrical properties of the composite powder and resin is achieved, the resin is cured. The resin may be a heat activated resin, a light activated resin, or a resin activated by mixing two or more components of the resin. When the resin has been cured in the container using the appropriate method, the adjustable element can be used.

In some embodiments, the uncured powder resin mixture may be subjected to magnetic fields to achieve the desired electrical properties of the composite powder and resin. The magnetic field may be applied when the powder resin mixture is in the container 905, 1005, 1105, 1205 by a coil wrapped around the container, an external electromagnet, or permanent magnet. The magnetic field may be applied alone or in combination with compression. The magnetic field may be applied before the curing of the resin and/or during the curing of the resin.

In some embodiments, the resin is a hard non-viscoelastic material in other embodiments the resin is a viscoelastic material and can be easily deformed when cured. In some embodiments, the resin is replaced by an elastic material such as a rubber or silicone.

Magnetite is an oxide of iron that conducts electricity with conductivity of $2.5 \times 10^4 \, \Omega m^{-1}$ at room temperature and is also ferrimagnetic. When in powder form, the flow of electricity through the magnetite powder depends upon the packing of the magnetite powder. Loose packing reduces the flow of electricity because the current has to pass between the particles of the powder. Mixing the other powdered materials and/or the oils or electrolyte allows the conductivity to be adjusted.

Current flowing through the magnetite powder generates magnetic fields that couple with the magnetization of the magnetite and also cause the movement of the magnetite powder particles. Movement of the magnetite particles also changes the electrical conductivity. The interaction of the current flowing through the powder with the magnetization of the powder enhances the inductance of the adjustable element. Mixing other powdered materials with the magnetite also changes the coupling between the current flowing through the adjustable element and the magnetization of the magnetite, thus, changing the inductance.

Not all of the particles forming the powdered materials are necessarily electrically connected. With the correct compression of the powder, much of the powdered material is connected to one or other of the electrodes 910, 915, for example, but not electrically connected to both electrodes 910, 915. Powder electrically connected to one electrode may be close to powder connected to the other electrode, thereby causing a capacitor to form within the powder. Compression of the powder and composition of the powder allows the capacitance of the adjustable element to be changed.

Thus, the adjustable element has properties including inductance, capacitance, and resistance that can be adjusted by changing the compression and composition of the powder. This allows the adjustable element to be adjusted to adjust the capacitance, resistance and inductance of the adjustable element to correct the power factor of the load.

Moreover, the properties of the magnetite when compressed are dependent on the history of the current through and voltage across the magnetite material. For example, current flowing through the magnetite generates a magnetic field. The magnetic field magnetizes the magnetite powder, causing the particles to pull together. This pulling together of the powder particles decreases the resistivity of the magnetite powder. The reduced resistivity causes yet more current to flow and yet more magnetization, which pulls the particles in the powder together even more, again reducing the resistivity. Thus, under the correct conditions, the magnetite powder can have nonlinear properties. Depending on the composition of the powder, when the current is removed, the powder may relax into its original state, or remain in the reduced resistance state.

In a similar manner placing a high voltage across the magnetite powder, when the magnetite powder is in a high resistance state, may reduce the resistance. In the high resistance state the particles of magnetite are not electrically well-connected between the electrodes. Thus particles near one or other electrode will attain a voltage near to that of their respective electrode. Particles of the powder with opposite polarity will attract, thereby compressing some volumes of the particle powder. The compressed volumes of particle powder will have greater conductivity. Thus, the particle powder may rapidly become conductive when a large voltage is placed across the powder. Depending on the composition of the powder, when the voltage is removed, the powder may relax into its original state, or remain in the reduced resistance state.

The properties of the adjustable element, inductance, capacitance and resistance form an inductor-capacitor-resistor (LCR) filter. FIG. 13 illustrates an equivalent circuit for the adjustable element with an equivalent inductance, L, equivalent resistance, R, and equivalent capacitance, C. The equivalent circuit forms a band pass filter with a resonant frequency $$f_0 = \frac{1}{2\pi}\sqrt{\frac{1}{LC} - \left(\frac{R}{L}\right)^2}$$

and a Q value $$Q = \frac{1}{R}\sqrt{\frac{L}{C}}$$

Thus, the adjustable element can be configured to pass the particular band of frequencies around the resonant frequency $f_0$ with the bandwidth of approximately $f_0/Q$, and suppress other frequencies. As discussed above, the inductance, capacitance, and resistance of the adjustable element can all be adjusted by either compression of the powder material in the adjustable element or application of a magnetic field to the adjustable element. The values of the inductance, capacitance and resistance, however, are not independent. For example, adjusting the resistance, may also adjust the capacitance and inductance. If both compression and magnetic field are applied to the powder in the adjustable element, values of the equivalent inductance, L, equivalent resistance, R, and the equivalent capacitance, C may be adjusted somewhat independently. The resonant frequency and the Q of the adjustable element are also adjustable by changing the compression of and a magnetic field through the adjustable element. Thus, the adjustable element forms a tunable filter, the frequency and Q of which can be adjusted as needed. This can be particularly useful in dealing with power factor correction due to nonlinear loads. As discussed above, the nonlinear loads generate harmonics of the power line frequency. The harmonics of the power line frequency are reflected back to the grid is wasted power. The harmonics of the power line frequency, may be, at odd or even multiples of the power line frequency. Detecting and suppressing these harmonics improves the power factor, The power factor adjuster also reduces EMI by filtering the spikes and harmonics that cause EMI.

Figure 14:
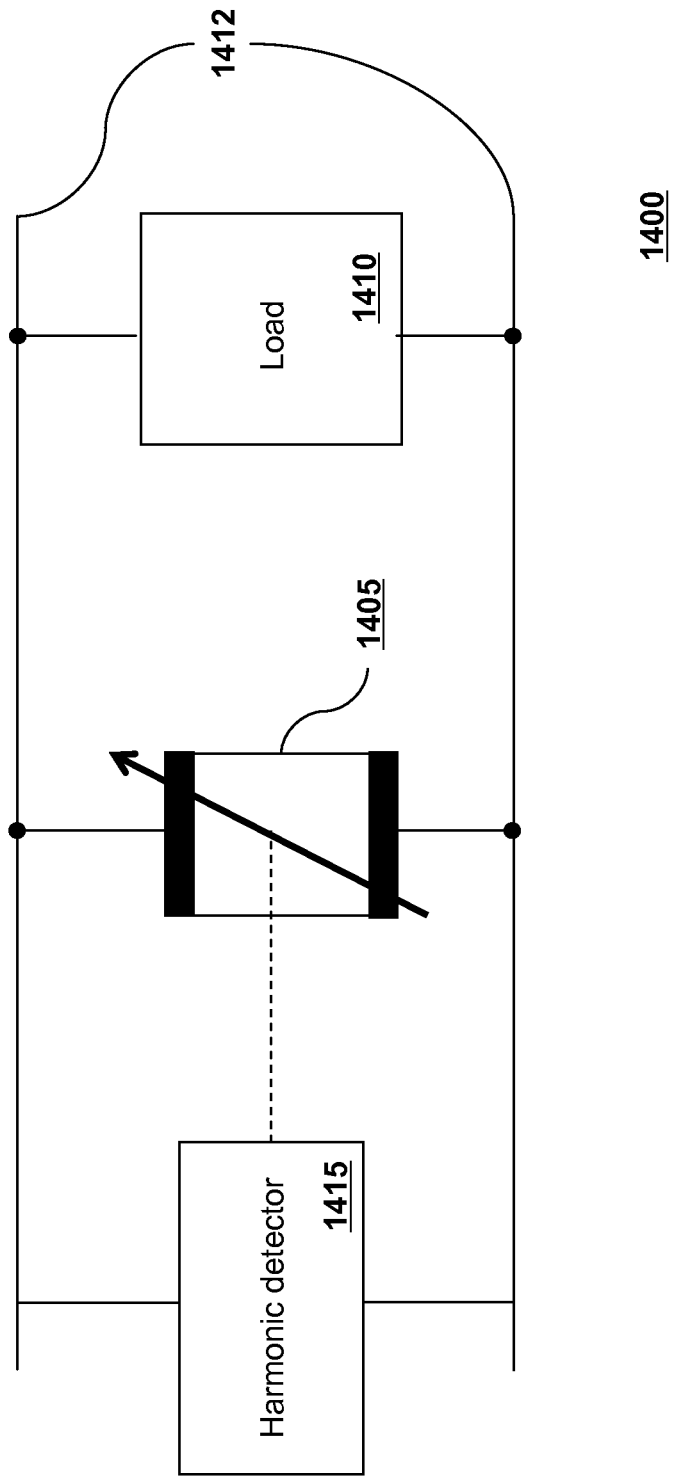
FIG. 14 illustrates a system that uses an adjustable element to improve the power factor, according to an exemplary embodiment.

FIG. 14 illustrates a system 1400 that uses an adjustable element 1405 to improve the power factor by filtering harmonics generated by a load 1410 attached to the power lines 1412. The adjustable element 1405 is configured to have a resonant frequency the same as the power line frequency. If the harmonics are detected by a harmonic detector 1415, the harmonic detector 1415 sends a signal via wiring 1420 to adjust the Q of the adjustable element to suppress the harmonics.

The resonant frequency of the adjustable element filter will be changed if there is significant additional inductance caused by, for example, additional capacitors or an inductors in parallel with the adjustable element 1405. The load may have significant inductance or capacitance. For example, an induction motor has considerable inductance. Moreover, inductance of an induction motor changes with rotation speed and the loading of the motor. Thus, the resonant frequency $f_0$ and the Q of adjustable element filter must be continuously adjusted to account for the changes in inductance of the induction motor. If the adjustable element is a part of any power factor adjustment unit, for example, power factor adjustment unit 405, the fixed capacitors within the power factor adjustment unit may be switched in parallel with the adjustable element. Thus changing the resonant frequency $f_0$ and the Q of the adjustable element filter. Accordingly, the resonant frequency and the Q of the adjustable element filter are continuously adjusted to maintain the correct resonant frequency independent of additional inductance or capacitance added to the circuit.

As discussed above, the properties of the powder may be dependent on the history of the current through the adjustable element and the voltage across the adjustable element. Thus, the capacitance resistance and inductance of the adjustable element may be configured to change upon the particular combination of voltage or current occurring on the power line. For example, the adjustable element might be configured to change the resonant frequency $f_0$ and the Q dependent upon an over voltage occurring on the power lines or a spike on the power lines.

The nonlinear properties of the powder material, including a powder encased in a resin or in a liquid, in a properly adjusted adjustable element, for example, adjustable elements 900, 1000, 1100, 1200 make the adjustable element suitable as surge arresters and power spike removers. By adjusting the composition of the powder material in the adjustable element, the compression of the powder material in the adjustable element and any magnetic field passing through the adjustable element as discussed above, the voltage or current at which the adjustable element becomes suddenly conducting may be changed. If, for example, the RMS line voltage is 110 V, the peak voltage will be 156 V. A properly adjusted adjustable element may become suddenly conducting at 170 V. In this case any spikes on the line voltage above 170 V will cause the adjustable element to become suddenly conducting, and the energy will be dissipated in the adjustable element rather than any load equipment positioned after the adjustable element.

Figure 15:
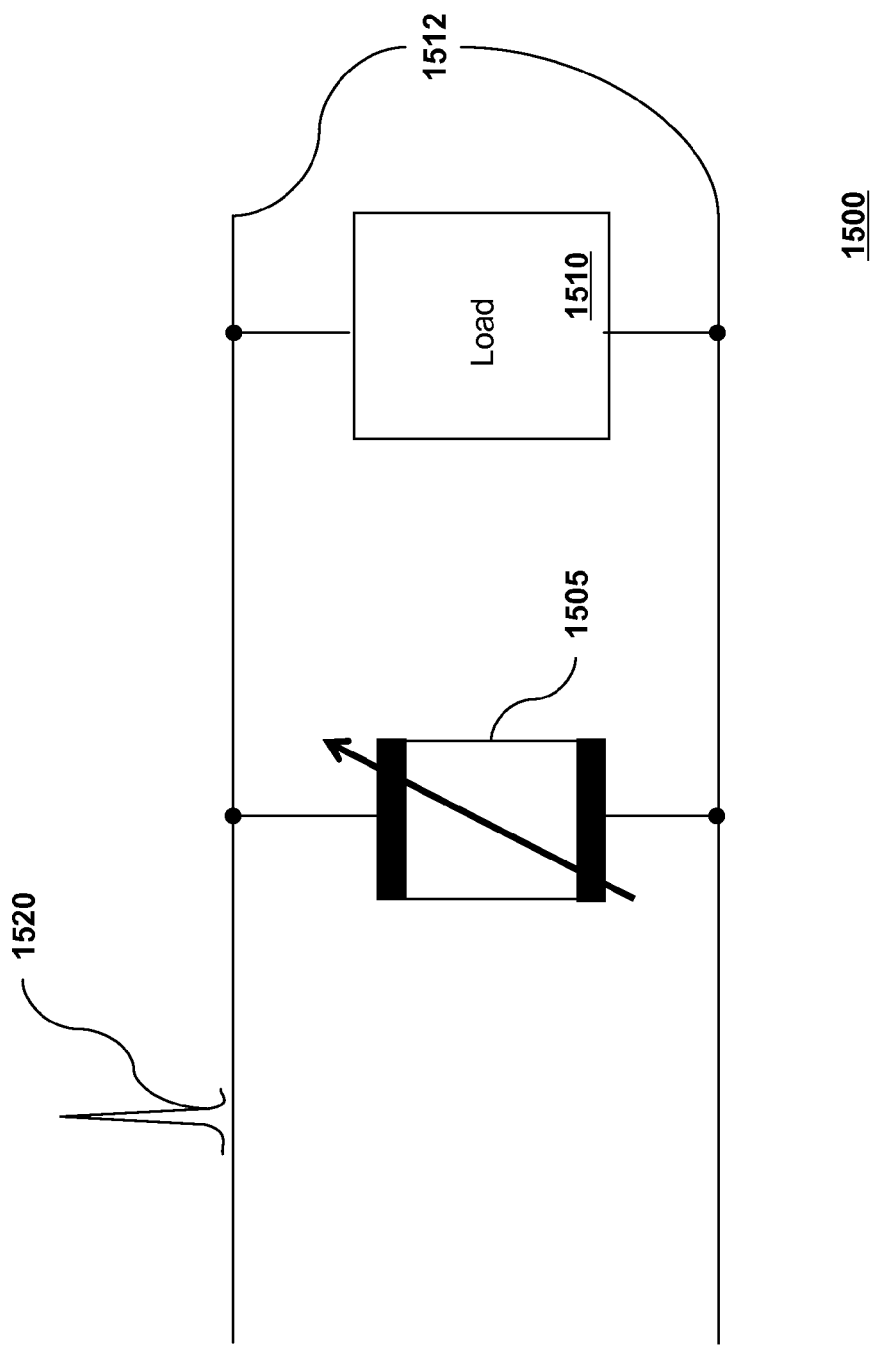
FIG. 15 illustrates a system for the use of an adjustable element as a surge arrester, according to an exemplary embodiment.

FIG. 15 illustrates a system 1500 for the use of an adjustable element as a surge arrester. The surge arrester the 1505 is placed across power lines 1512 between the grid and the load 1510. A spike 1520 on the power lines 1512 causes the powder material in the adjustable element 1505 to become conducting, thereby dissipating the energy of the spike in the adjustable element rather than the load 1510.

In some embodiments, the adjustable element 1505 is configured to act as a resettable surge arrester. The adjustable element 1505 is configured to increase the conductivity of the powder material in the adjustable element 1505 when a surge on the power lines 1512 occurs. After the surge, the adjustable element remains in increased productivity state. The adjustable element 1505 is configured to return to the original conductivity when, for example, the power on power lines 1512 is reduced to zero for a period of time, or when an external a magnetic field penetrates or is removed from the adjustable element by, for example, the close approach or removal of a permanent magnet.

Figure 16:
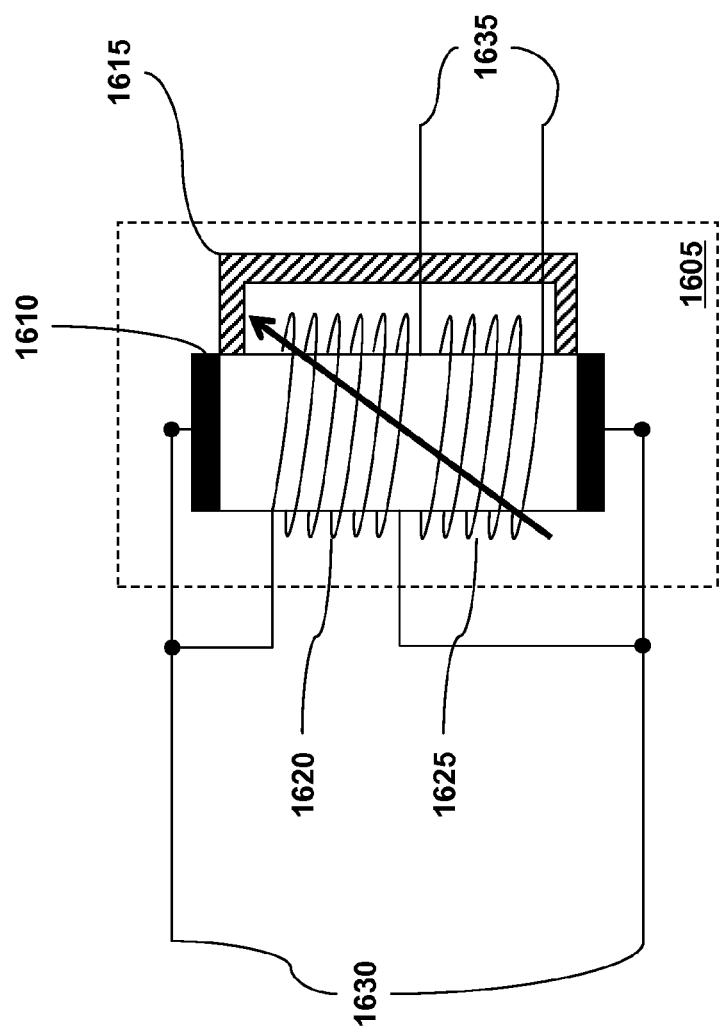
FIG. 16 illustrates a transformer incorporating an adjustable element, according to an exemplary embodiment.

The magnetic properties of the magnetite powder in an adjustable element allow the adjustable element to be used as a part of the core of a transformer. FIG. 16 illustrates a transformer 1605 incorporating an adjustable element 1610. The adjustable element 1610 forms a part of the magnetic core of the transformer, where the magnetic circuit of the core is completed by a magnetic element 1615. Primary and secondary windings 1620, 1625 are wound around the core of the transformer 1605. As discussed above, the magnetic properties of the adjustable element change when compression, a magnetic field, a voltage, or a current is applied to the adjustable element. Thus, the adjustable element may be used to change the magnetic conductivity of the core of the transformer 1605, therefore, changing the coupling between the primary and secondary windings 1620, 1625 of the transformer. In some embodiments, as illustrated in FIG. 16, the primary and secondary windings 1620, 1625 are wound around the adjustable element 1610. In other embodiments, the primary winding 1620 and/or secondary coil 1625 are wound around the magnetic element 1615. In some other embodiments, the adjustable element 1610 is connected across the power lines 1630 connected to the primary winding, as illustrated in FIG. 16. Thus, adjustable element 1610 may be configured to absorb the spike on the power lines 1630, as discussed above with regard to the surge arresting, and/or change the magnetic properties of the transformer core to reduce the amount of power transmitted to the secondary windings 1625. Alternatively, the adjustable element 1610 may be connected across the secondary windings 1625 and the output power lines 1635 in order to detect spikes on the secondary windings 1625. Thus, adjustable element 1610 may be configured to absorb spikes on the power lines 1635 and/or change the magnetic properties of the transformer core to reduce the amount of power transmitted to the secondary windings 1625.

In some embodiments, the adjustable element 1610 is configured to act as a resettable surge arrester. The adjustable element 1610 is configured to reduce the magnetic conductivity of the core transformer 1605 when a surge on the power lines 1630 occurs. The adjustable element 1610 is configured to return to the original magnetic inductance when, for example, the power on power lines 1630 is reduced to zero, for a period of time, or when an external magnetic field penetrates or is removed from the adjustable element by, for example, the close approach or removal of a permanent magnet.

Figure 17:
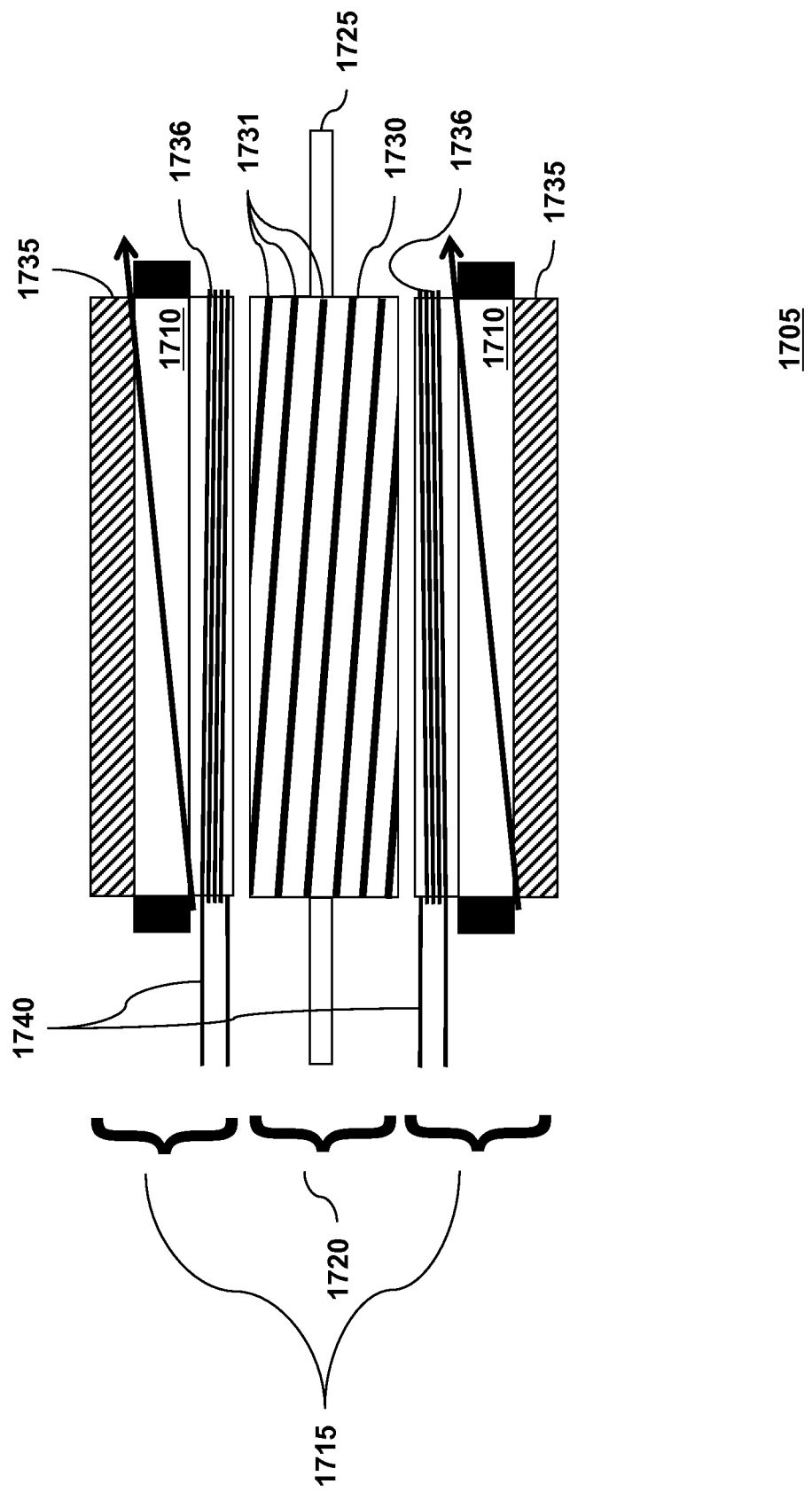
FIG. 17 illustrates an electric motor incorporating an adjustable element, according to an exemplary embodiment.

The magnetic properties of the magnetite powder in an adjustable element allow the adjustable element to be used as a portion of the core of an electric motor. FIG. 17 illustrates a cross-section of an electric motor 1705 incorporating adjustable elements 1710. The electric motor comprises a stator 1715 and a rotor 1720. The rotor spins on axle 1725 and comprises a magnetic core 1730 with electrical windings 1731. The stator comprises a magnetic core including magnetic elements 1735 and 1736, adjustable elements 1710, and stator coils 1740 wound around the magnetic elements 1736. The adjustable element 1710 forms a portion of the magnetic core of the magnetic circuit of the core that is completed by a magnetic elements 1735, 1736 and the core 1730. As discussed above, the magnetic properties of the adjustable element change when compression, a magnetic field, a voltage, or a current is applied to the adjustable element. Thus, the adjustable element may be used to change the magnetic conductivity of the core of the motor 1705, thereby changing the coupling between the stator 1715 and rotor 1720. In some embodiments, as illustrated in FIG. 17, a portion of the stator 1715 is formed of the adjustable element 1710. In other embodiments, a portion of the rotor core 1730 is formed of an adjustable element. In some other embodiments, the adjustable element 1710 is connected across the supply to the stator coils 1740. Thus, adjustable element 1710 may be configured to absorb spikes on the stator coils 1740 or compensate the power factor of the electric motor 1705.

The magnetic properties of the magnetite powder allow the adjustable element to be used as a variable capacitor. As discussed above, by changing the amount of compression on the magnetite powder or the magnetic field applied to the magnetite powder, the electrical properties of the adjustable element can change. Among the changed electrical properties is a change in the overall capacitance of the adjustable element. Thus, the adjustable element as described above may be implemented as a variable capacitor.

Figure 18:
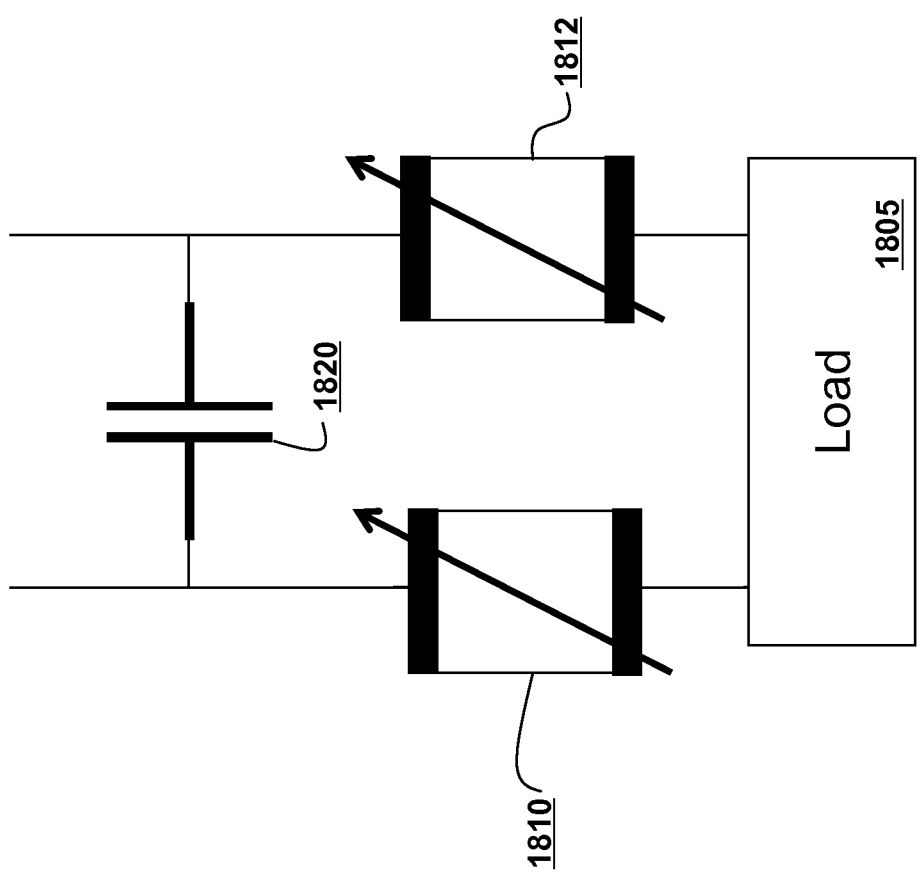
FIG. 18 illustrates a system for the use of an adjustable element as a variable resistor to limit the discharge of a capacitor according to an exemplary embodiment.

An adjustable element may also be used in combination with a capacitor to allow the capacitor to function much like a battery to limit the amount of charge discharged from a charged capacitor. FIG. 18 illustrates a circuit diagram for using the adjustable element in combination with a capacitor according to an exemplary embodiment. As shown in FIG. 18, a first adjustable element 1810 and a second adjustable element 1812 are connected to the capacitor 1820. The first adjustable element 1810 is connected to a first terminal of the capacitor 1820 and the second adjustable element 1812 is connected to the a second terminal of the capacitor. The capacitor 1820 is also connected to an input (not shown), for example a power source. When a potential difference is applied to the capacitor 1820, energy is stored in an electric field in the capacitor. The energy stored in the capacitor can be released, but the release is nearly instantaneous. By connecting the adjustable elements 1810, 1812 to the capacitor, the energy release can be slowed, and a load 1805 may receive energy from the capacitor 1820. The adjustable element 1810, 1812 can have a nearly infinitely adjustable impedance. By adjusting the impedance of the adjustable elements 1810, 1812 the amount of energy provided to the load 1805 can be controlled.

Figure 19:
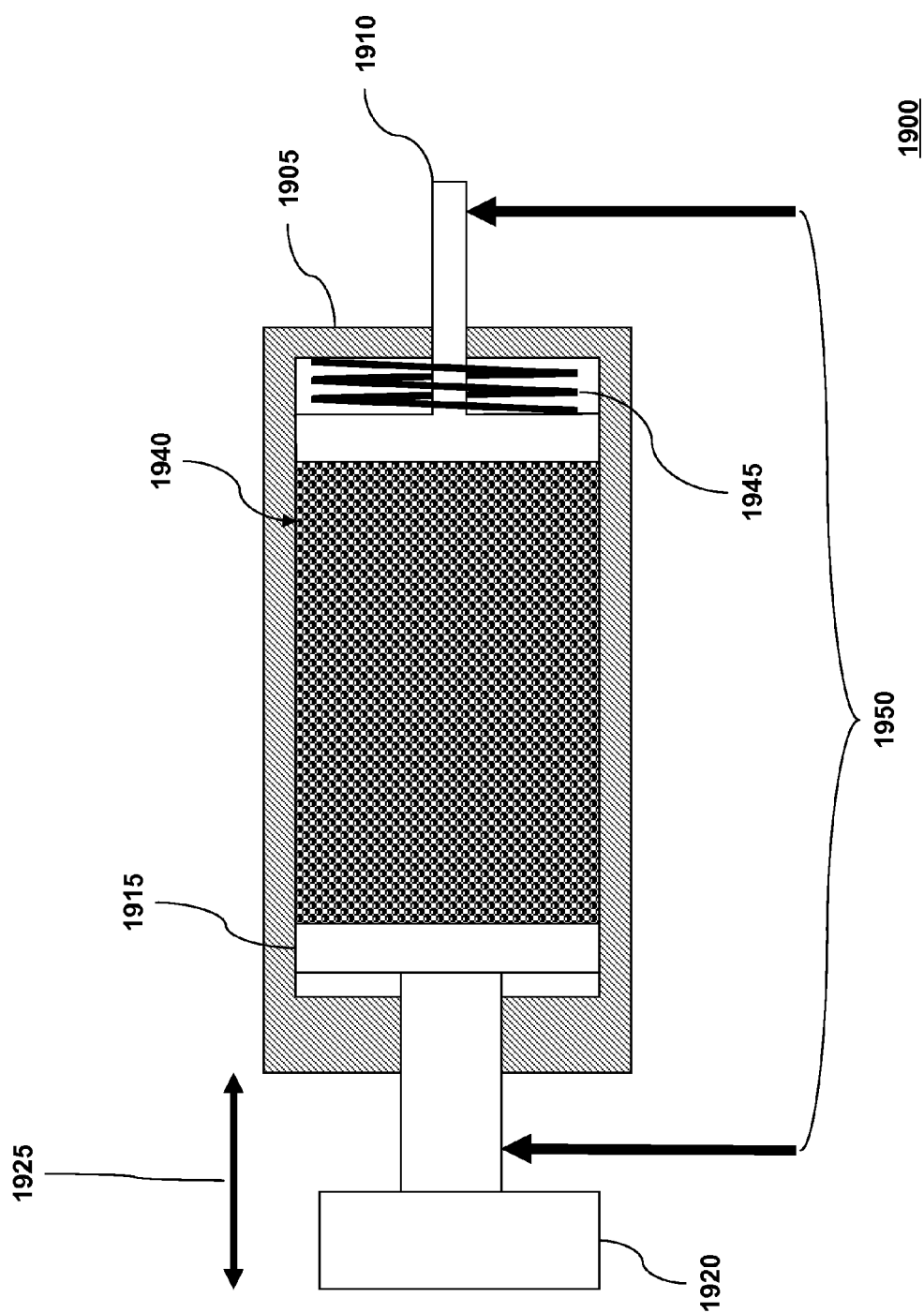
FIG. 19 illustrates an adjustable element, according to another exemplary embodiment.

FIG. 19 illustrates an adjustable element 1900, according to an exemplary embodiment. The adjustable element 1900 can be used as the adjustable element 1810 or 1812 shown in FIG. 18 and can be configured to operate with a capacitor. The adjustable element 1900 comprises a container 1905. The container 1905 may be made from any non-conducting material, for example, nylon, polycarbonate, polyethylene, polypropylene, Teflon, alumina, glass, resin, fiberglass resin, Bakelite, or any other insulating material compatible with embodiments of the disclosure. The container 1905 has electrodes 1910, 1915 positioned at each end of the container. In some embodiments, both of the electrodes 1910, 1915 are fixed. In other embodiments, one of the electrodes is fixed, and the other electrode is movable. In yet other embodiments, electrodes 1910, 1915 are both movable. In some embodiments, one of the electrodes, for example, electrodes 1910, as shown in FIG. 19, has a spring 1945 between the inside of the container 1905 and the electrodes 1910. The spring 1945 provides pressure on the back of the electrodes 1910, pushing the electrode 1910 toward the electrode 1915. The spring 1945 makes adjustment of the compression of a material 1940 between the electrodes 1910 and 1915 more reliable.

The electrodes 1910, 1915 may be made from copper, gold, silver, palladium, platinum, ruthenium, nickel, iron, aluminum, tungsten, titanium, titanium nitrite, tantalum, tantalum nitride, chromium, lead, cadmium, zinc, manganese, lithium cobalt oxide, lithium iron phosphate, lithium manganese oxide, nickel oxyhydroxide, or any combination of the above or any other metals compatible with embodiments of the disclosure. The electrodes may be formed of one or more of the above metals and then coated in a second of the above metals. The electrodes 1910, 1915 may also be made of semiconductor materials, for example, carbon in the form of diamond or graphite, silicon, silicon carbide, germanium or any combination of those semiconductors with each other, or with one of the above metals. In some embodiments, the electrodes 1910, 1915 are made of the same material. In other embodiments, the electrodes 1910, 1915 are made of different materials.

Electrode 1915 is movable using compression device 1920. Pushing or pulling the compression device 1920 in the direction of the arrows 1925 causes the compression device 1920 to slide through a hole in the container 1905 in the direction of arrows 1925. The compression device 1920 is attached to the moving electrode 1915 and pushes the moving electrode 1915 toward or away from electrode 1910.

A material 1940 is placed between the electrodes 1910 and 1915. The material 1940 is compressed by moving electrode 1915 toward electrodes 1910. The compression of the material 1940 may be performed by any of the methods above, such as a screw, a compression device, or actuators. The material 1940 allows current to flow between the electrodes 1910, 1915 and is responsible for the electrical properties of the adjustable element 1900. Compressing the material 1940 changes the electrical properties.

Connections 1950 to the electrodes 1910, 1915 via compression device 1920 allow the adjustable element 1900 to be connected in the circuit, for example, as adjustable element 1810, 1812 in FIG. 18.

The compression material of the adjustable element 1900 is a plurality of small aluminum beads. The aluminum beads may be coated with an insulation coating, such as silicon or any other type of material exhibiting insulating properties. In some of the embodiments described above, magnetite was described as the material 1940. Magnetite, or a comparable material, may be mixed with the aluminum beads, or the magnetite may be omitted.

The aluminum beads can change the electrical properties of the adjustable element 1900 by mechanical compression. However, any compression technique, such as those described above, can dynamically change the electrical properties of the aluminum beads. The adjustable element 1900 comprising aluminum beads as described above may be connected to any size capacitor, from a capacitor having a very small capacitance to a capacitor having a very large capacitance, such as a super capacitor.

Table 1 shows the results of testing of a power factor adjustment unit similar to the power factor adjustment unit 405 discussed above. The power factor adjustment unit used for the testing is a manual version in which the switches for the fixed capacitors, for example, capacitors 415, and the adjustable element, for example, adjustable element 420, are switched manually to correct the power factor. Further, the power factor adjustment unit used for testing has an adjustable element that is adjusted manually by compression of pure magnetite powder in the adjustable element. The load for the power factor adjustment unit is a 1 hp induction motor made by Marathon™. The induction motor was run at a voltage of 241 V both with and without load. The adjustment unit setting corresponds to a quantity of capacitance from the capacitors and a compression of the magnetite powder. The adjustment unit setting of zero corresponds to the power factor adjustment unit being disconnected from the circuit.

Figure 20:
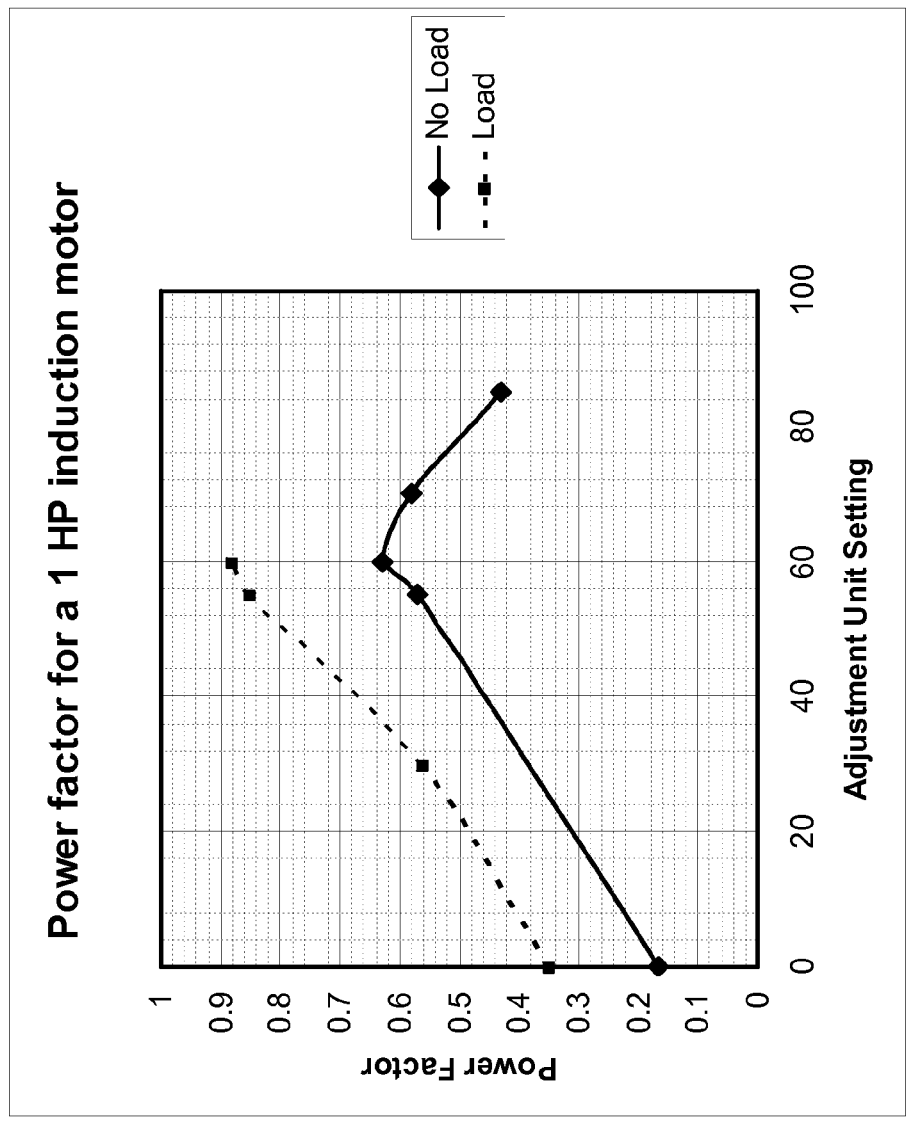
FIG. 20 illustrates adjustment unit setting versus power factor for the induction motor and power factor adjustment unit combination, according to an exemplary embodiment.

FIG. 20 illustrates, in particular, adjustment unit setting versus power factor for the induction motor and power factor adjustment unit combination. As illustrated in FIG. 20, the power factor is considerably improved when the induction motor is run with or without a load. In particular, the adjustment unit could be set to between 60 and 70 to maximize the power factor at 0.64 for an unloaded motor, and increase the power factor to almost 0.9 for a loaded motor.

TABLE 1

| Voltage across motor (V) | Load applied to motor | Adjustment unit setting | Current supplied (A) | Apparent power (kW) | Power Factor | Percent Saved |
|---|---|---|---|---|---|---|
| 241 | No | 0 | 6.11 | 1.47 | 0.166 | 0% |
| 241 | No | 55 | 1.77 | 0.427 | 0.57 | 61% |
| 241 | No | 70 | 1.6 | 0.388 | 0.58 | 74% |
| 241 | No | 60 | 1.6 | 0.379 | 0.63 | 74% |
| 241 | No | 85 | 2.39 | 0.588 | 0.429 | 41% |
| 241 | Yes | 0 | 6.22 | 1.49 | 0.35 | 0% |
| 241 | Yes | 30 | 3.78 | 0.93 | 0.56 | 40% |
| 241 | Yes | 60 | 2.43 | 0.59 | 0.88 | 61% |
| 241 | Yes | 55 | 2.52 | 0.6 | 0.85 | 60% |

Figure 21:
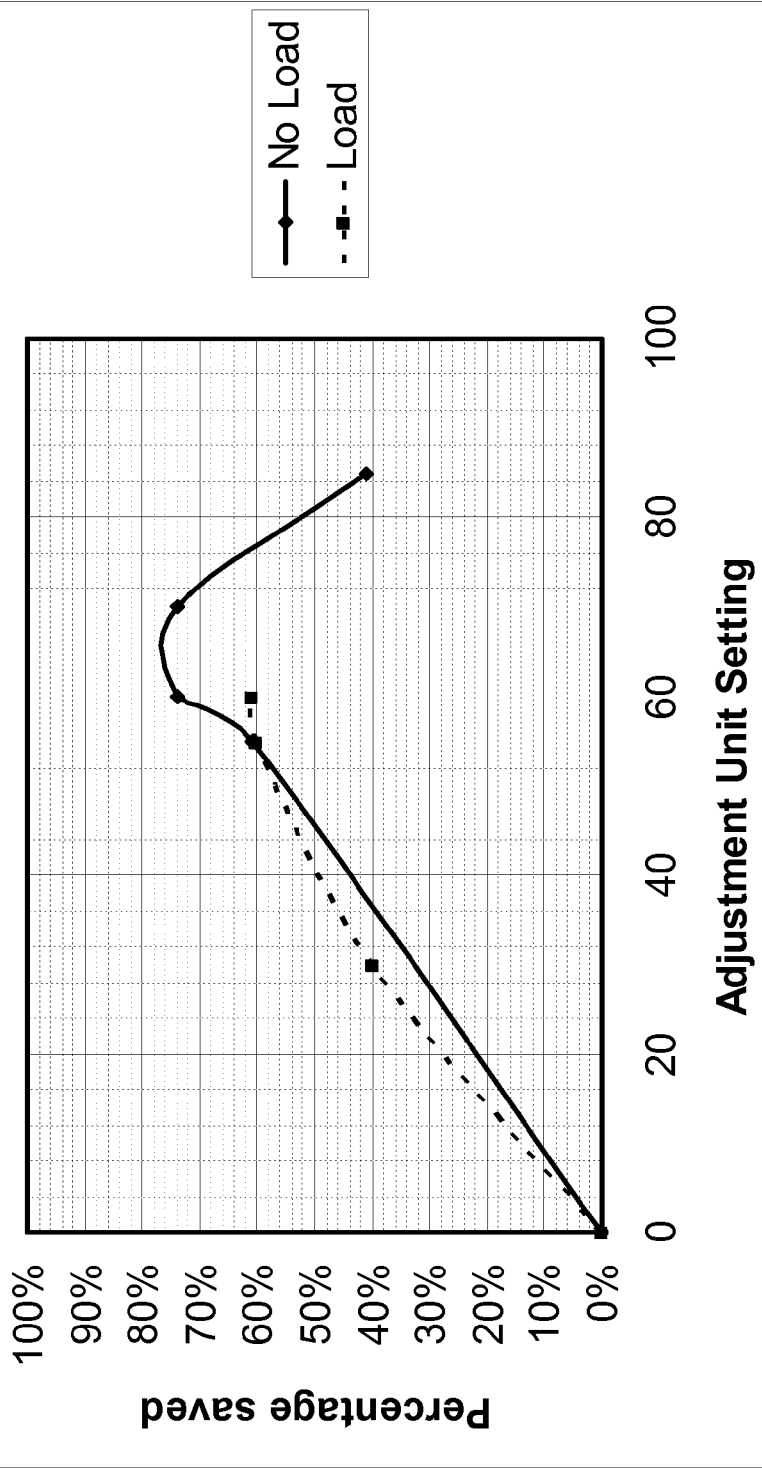
FIG. 21 illustrates the percentage savings due to the use of the power factor adjustment unit, according to an exemplary embodiment.

FIG. 21 illustrates, in particular, the percentage savings due to the use of the power factor adjustment unit. The power factor adjustment unit delivers savings of up to 74% for an unloaded motor.

Table 2 shows the results of testing of a power factor adjustment unit similar to the power factor adjustment unit used to obtain the result in Table 1. The load for the power factor adjustment unit is a ½ hp, 115V, 60 Hz induction motor made by Marathon™.

TABLE 2

| Voltage across motor (V) | Adjustment unit state | Load applied to motor | Current supplied (A) | Apparent power (kW) | Power Factor | Percent Saved |
|---|---|---|---|---|---|---|
| 120 | OFF | No | 5.87 | 0.690 | 0.38 | 0% |
| 120 | ON | No | 1.74 | 0.233 | 1.00 | 70% |
| 120 | OFF | Yes | 7.8 | 0.890 | 0.77 | 0% |
| 120 | ON | Yes | 5.0 | 0.520 | 1.00 | 36% |

The power factor adjustment unit delivers savings of up to 70% for an unloaded motor and 36% for a loaded motor. Moreover, the power factor with the power factor adjustment unit is unity for both the loaded and unloaded motor.

Table 3 shows the results of testing of a power factor adjustment unit similar to the power factor adjustment unit used to obtain the result in Table 1. The load for the power factor adjustment unit is a 1 hp, 115/230 V, 60 Hz induction motor made by Marathon™.

TABLE 3

| Voltage across motor (V) | Adjustment unit state | Load applied to motor | Current supplied (A) | Apparent power (kW) | Power Factor | Percent Saved |
|---|---|---|---|---|---|---|
| 241 | OFF | No | 6.02 | 1.450 | 0.51 | 0% |
| 241 | ON | No | 1.27 | 0.306 | 0.86 | 41% |
| 241 | OFF | Yes | 5.7 | 1.373 | 0.36 | 0% |
| 241 | ON | Yes | 2.78 | 0.669 | 1.00 | 51% |

The power factor adjustment unit delivers savings of up to 51% for a loaded motor and 41% for an unloaded motor. Moreover, the power factor with the power factor adjustment unit is unity for the loaded motor.

Table 4 shows the verification of the above test results by an independent testing company for the power factor adjustment unit used in combination with a ⅓ hp induction motor. The induction motor is a 115 V 60 Hz motor running at 1,762 RPM. Enabling the power factor adjustment unit causes a drop in current consumption of the motor of 2.3 A and a savings of 44%.

TABLE 4

| Voltage across motor (V) | Adjustment unit state | Current supplied (A) | Apparent power (kW) | Power Factor | Percent Saved |
|---|---|---|---|---|---|
| 117.4 | OFF | 5.2 | 0.610 | 0.47 | 0% |
| 117.1 | ON | 2.9 | 0.340 | 0.85 | 44% |

The embodiments described above are intended to be exemplary. One skilled in the references recognizes that numerous alternative components and embodiments that may be substituted for the particular examples described herein and still fall within the scope of the invention.

What is claimed is:

1. An adjustable element comprising:
a container comprised of a non-conducting material;
a first electrode positioned in the container at a first end of the container, wherein the first electrode is movable within the container;
a second electrode positioned in the container at a second end of the container;
a compression material positioned in the container between the first and second electrodes;
a first connection connected to the first electrode and a second connection connected to the second electrode for connection to a circuit; and
a compression device attached to the first electrode that moves the first electrode toward the second electrode to apply compression to the compression material and thereby change the electrical properties of the adjustable element, wherein the compression device has screw threads that engage with a threaded hole in the first end of the container, and the compression device moves the first electrode toward the second electrode by turning the compression device through the threaded hole.

2. The adjustable element of claim 1, further comprising:
a spring positioned between the second end of the container and the second electrode pushing the second electrode toward the first electrode.

3. The adjustable element of claim 1, wherein the first electrode is selected from the group consisting of copper, gold, silver, palladium, platinum, ruthenium, nickel, iron, aluminum, tungsten, titanium, titanium nitride, tantalum, tantalum nitride, chromium, lead, cadmium, zinc, manganese, lithium cobalt oxide, lithium iron phosphate, lithium manganese oxide, and nickel oxyhydroxide.

4. The adjustable element of claim 1, wherein the second electrode is selected from the group consisting of copper, gold, silver, palladium, platinum, ruthenium, nickel, iron, aluminum, tungsten, titanium, titanium nitride, tantalum, tantalum nitride, chromium, lead, cadmium, zinc, manganese, lithium cobalt oxide, lithium iron phosphate, lithium manganese oxide, and nickel oxyhydroxide.

5. The adjustable element of claim 1, wherein the first electrode comprises a semiconductor material.

6. The adjustable element of claim 1, wherein the second electrode comprises a semiconductor material.

7. The adjustable element of claim 1, wherein the compression material is powdered magnetite.

8. The adjustable element of claim 7, wherein the powdered magnetite is mixed with a mineral oil, synthetic oil, a liquid electrolyte, or semi-solid electrolyte.

9. The adjustable element of claim 7, wherein the powdered magnetite is mixed with graphite, diamond, quartz, sapphire, beryl, gold, copper, silver, platinum, palladium, nickel, molybdenum, aluminum, molybdenum disulfide, titanium disulfide, silica, corundum, or powdered rare earth magnetic materials.

10. The adjustable element of claim 7, wherein the powdered magnetite is positioned between the electrodes in a hardened resin.

11. The adjustable element of claim 1, wherein the compression device is a held in place by tightening a screw set extending through a threaded hole in the container against the compression device.

12. The adjustable element of claim 1, wherein the compression device is turned by a stepper motor or a geared motor.

13. An adjustable element comprising:
a container comprised of a non-conducting material;
a first electrode positioned in the container at a first end of the container, wherein the first electrode is movable within the container;
a second electrode positioned in the container at a second end of the container;
a compression material positioned in the container between the first and second electrodes;
a first connection connected to the first electrode and a second connection connected to the second electrode for connection to a circuit; and
a compression device attached to the first electrode that moves the first electrode toward the second electrode to apply compression to the compression material and thereby change the electrical properties of the adjustable element, wherein the compression device is a piezoelectric actuator placed between the first electrode and the first end of the container.

14. An adjustable element comprising:
a container comprised of a non-conducting material;
a first electrode positioned in the container at a first end of the container, wherein the first electrode is movable within the container;
a second electrode positioned in the container at a second end of the container;
a compression material positioned in the container between the first and second electrodes;
a first connection connected to the first electrode and a second connection connected to the second electrode for connection to a circuit; and
a compression device attached to the first electrode that moves the first electrode toward the second electrode to apply compression to the compression material and thereby change the electrical properties of the adjustable element, wherein the compression device is a magnetic actuator placed between the first electrode and the first end of the container.

15. An adjustable element comprising:
a container comprised of a non-conducting material;
a first electrode positioned in the container at a first end of the container, wherein the first electrode is movable within the container;
a second electrode positioned in the container at a second end of the container;
a compression material positioned in the container between the first and second electrodes;
a first connection connected to the first electrode and a second connection connected to the second electrode for connection to a circuit; and
a compression device attached to the first electrode that moves the first electrode toward the second electrode to apply compression to the compression material and thereby change the electrical properties of the adjustable element, wherein the compression device comprises a first permanent magnet positioned between the first end of the container and the first electrode and a second permanent magnet positioned outside of the container and moved by an actuator.

16. An adjustable element comprising:
a container comprised of a non-conducting material;
a first electrode positioned in the container at a first end of the container;
a second electrode positioned in the container at a second end of the container;
a compression material positioned in the container between the first and second electrodes;

a first connection connected to the first electrode and a second connection connected to the second electrode for connection to a circuit;

a coil wound around the container to produce a magnetic field within the compression material thereby changing the electrical properties of the adjustable element; and a compression device attached to the first electrode that moves the first electrode toward the second electrode to apply compression to the compression material and further change the electrical properties of the adjustable element, wherein the compression device is a held in place by tightening a screw set extending through a threaded hole in the container against the compression device.

17. An adjustable element comprising:

a container comprised of a non-conducting material;

a first electrode positioned in the container at a first end of the container;

a second electrode positioned in the container at a second end of the container;

a compression material positioned in the container between the first and second electrodes;

a first connection connected to the first electrode and a second connection connected to the second electrode for connection to a circuit;

a coil wound around the container to produce a magnetic field within the compression material thereby changing the electrical properties of the adjustable element; and a compression device attached to the first electrode that moves the first electrode toward the second electrode to apply compression to the compression material and further change the electrical properties of the adjustable element, wherein the compression device has screw threads that engage with a threaded hole in the first end of the container, and the compression device moves the first electrode toward the second electrode by turning the compression device through the threaded hole.

18. The adjustable element of claim 17, wherein the compression device is turned by a stepper motor or a geared motor.

19. An adjustable element comprising:

a container comprised of a non-conducting material;

a first electrode positioned in the container at a first end of the container;

a second electrode positioned in the container at a second end of the container;

a compression material positioned in the container between the first and second electrodes;

a first connection connected to the first electrode and a second connection connected to the second electrode for connection to a circuit;

a coil wound around the container to produce a magnetic field within the compression material thereby changing the electrical properties of the adjustable element; and a compression device attached to the first electrode that moves the first electrode toward the second electrode to apply compression to the compression material and further change the electrical properties of the adjustable element, wherein the compression device is a piezoelectric actuator placed between the first electrode and the first end of the container.

20. An adjustable element comprising:

a container comprised of a non-conducting material;

a first electrode positioned in the container at a first end of the container;

a second electrode positioned in the container at a second end of the container;

a compression material positioned in the container between the first and second electrodes;

a first connection connected to the first electrode and a second connection connected to the second electrode for connection to a circuit;

a coil wound around the container to produce a magnetic field within the compression material thereby changing the electrical properties of the adjustable element; and a compression device attached to the first electrode that moves the first electrode toward the second electrode to apply compression to the compression material and further change the electrical properties of the adjustable element, wherein the compression device is a magnetic actuator placed between the first electrode and the first end of the container.

21. The adjustable element of claim 20, further comprising:

a spring positioned between the second end of the container and the second electrode pushing the second electrode toward the first electrode.

22. The adjustable element of claim 20, wherein the first electrode is selected from the group consisting of copper, gold, silver, palladium, platinum, ruthenium, nickel, iron, aluminum, tungsten, titanium, titanium nitrite, tantalum, tantalum nitride, chromium, lead, cadmium, zinc, manganese, lithium cobalt oxide, lithium iron phosphate, lithium manganese oxide, and nickel oxyhydroxide.

23. The adjustable element of claim 20, wherein the second electrode is selected from the group consisting of copper, gold, silver, palladium, platinum, ruthenium, nickel, iron, aluminum, tungsten, titanium, titanium nitrite, tantalum, tantalum nitride, chromium, lead, cadmium, zinc, manganese, lithium cobalt oxide, lithium iron phosphate, lithium manganese oxide, and nickel oxyhydroxide.

24. The adjustable element of claim 20, wherein the first electrode comprises a semiconductor material.

25. The adjustable element of claim 20, wherein the second electrode comprises a semiconductor material.

26. The adjustable element of claim 20, wherein the compression material is powdered magnetite.

27. The adjustable element of claim 26, wherein the powdered magnetite is mixed with a mineral oil, synthetic oil, a liquid electrolyte, or semi-solid electrolyte.

28. The adjustable element of claim 26, wherein the powdered magnetite is mixed with graphite, diamond, quartz, sapphire, beryl, gold, copper, silver, platinum, palladium, nickel, molybdenum, aluminum, molybdenum disulfide, titanium disulfide, silica, corundum, or powdered rare earth magnetic materials.

29. The adjustable element of claim 26, wherein the powdered magnetite is positioned between the electrodes in a hardened resin.

* * * * *